US010547175B2

(12) United States Patent
Divan et al.

(10) Patent No.: US 10,547,175 B2
(45) Date of Patent: Jan. 28, 2020

(54) SYSTEMS AND METHODS FOR EDGE OF NETWORK VOLTAGE CONTROL OF A POWER GRID

(71) Applicant: Varentec, Inc., Santa Clara, CA (US)

(72) Inventors: Deepakraj M. Divan, San Jose, CA (US); Rohit Moghe, Atlanta, GA (US); Anish Prasai, San Jose, CA (US); Andrew Dillon, Los Altos, CA (US)

(73) Assignee: Varentec, Inc., Santa Clara, CA (US)

( * ) Notice: Subject to any disclaimer, the term of this patent is extended or adjusted under 35 U.S.C. 154(b) by 0 days.

(21) Appl. No.: 16/130,948

(22) Filed: Sep. 13, 2018

(65) Prior Publication Data

US 2019/0089158 A1   Mar. 21, 2019

Related U.S. Application Data

(63) Continuation of application No. 14/659,418, filed on Mar. 16, 2015, which is a continuation-in-part of (Continued)

(51) Int. Cl.
*H02J 3/12* (2006.01)
*G05B 15/02* (2006.01)
(Continued)

(52) U.S. Cl.
CPC ............ *H02J 3/12* (2013.01); *G05B 15/02* (2013.01); *H02J 3/16* (2013.01); *H02J 3/1828* (2013.01);
(Continued)

(58) Field of Classification Search
None
See application file for complete search history.

(56) References Cited

U.S. PATENT DOCUMENTS 4,365,190 A   12/1982  Pasternack et al.
4,709,269 A   11/1987  Ozaki
(Continued)

FOREIGN PATENT DOCUMENTS

CN   102082438 A1   6/2011
JP   2009254166 A   10/2009
(Continued)

OTHER PUBLICATIONS

First Office Action in Chinese Patent Application No. 2012800691846, dated Feb. 6, 2015.
(Continued)

*Primary Examiner* — Sean Shechtman
(74) *Attorney, Agent, or Firm* — Sheppard Mullin Richter & Hampton LLP

(57) ABSTRACT

Systems and methods for an edge of network voltage control of a power grid are described. A system includes a distribution power network, a plurality of loads (at or near an edge of the distribution power network), and a plurality of shunt-connected, switch-controlled volt ampere reactive (VAR) sources also located at the edge or near the edge of the distribution power network where they may each detect a proximate voltage. The VAR source can determine whether to enable a VAR compensation component therein based on the proximate voltage and adjust network VAR by controlling a switch to enable the VAR compensation component. Further still, each of the VAR sources may be integrated within a customer-located asset, such as a smart meter, and a multitude of such VAR sources can be used to effectuate a distributed controllable VAR source (DCVS) cloud network.

8 Claims, 29 Drawing Sheets

Related U.S. Application Data application No. 13/488,330, filed on Jun. 4, 2012, now Pat. No. 9,014,867.

(60) Provisional application No. 61/635,797, filed on Apr. 19, 2012, provisional application No. 61/635,799, filed on Apr. 19, 2012, provisional application No. 61/579,610, filed on Dec. 22, 2011, provisional application No. 61/567,580, filed on Dec. 6, 2011, provisional application No. 61/535,892, filed on Sep. 16, 2011.

(51) Int. Cl.
 *H02J 3/16* (2006.01)
 *H02J 3/18* (2006.01)

(52) U.S. Cl.
 CPC .............. *Y02E 40/12* (2013.01); *Y02E 40/30* (2013.01); *Y02E 40/34* (2013.01); *Y04S 10/22* (2013.01)

(56) References Cited

U.S. PATENT DOCUMENTS

| | | | |
|---|---|---|---|
| 4,868,412 A | 9/1989 | Owens | |
| 5,093,630 A | 3/1992 | Sato | |
| 5,237,248 A | 8/1993 | Honma et al. | |
| 5,402,057 A | 3/1995 | D'Aquila et al. | |
| 5,485,075 A * | 1/1996 | Mori | H02J 3/18 323/205 |
| 5,563,777 A | 10/1996 | Miki et al. | |
| 5,646,512 A | 7/1997 | Beckwith | |
| 5,686,766 A | 11/1997 | Tamechika | |
| 6,067,482 A | 5/2000 | Shapiro | |
| 6,181,113 B1 | 1/2001 | Hu et al. | |
| 6,573,691 B2 | 6/2003 | Ma et al. | |
| 6,624,532 B1 | 9/2003 | Davidow et al. | |
| 6,643,112 B1 | 11/2003 | Herve et al. | |
| 7,091,703 B2 | 8/2006 | Folts et al. | |
| 7,149,605 B2 | 12/2006 | Chassin et al. | |
| 7,324,354 B2 | 1/2008 | Joshi et al. | |
| 7,746,259 B2 | 6/2010 | Dedic et al. | |
| 8,405,247 B2 | 3/2013 | Miller et al. | |
| 8,816,535 B2 | 8/2014 | Adest et al. | |
| 8,848,400 B2 | 9/2014 | Yuan et al. | |
| 9,014,867 B2 | 4/2015 | Divan | |
| 9,031,708 B2 | 5/2015 | Penzenstadler et al. | |
| 9,660,452 B2 | 5/2017 | Routimo | |
| 2002/0089411 A1 | 7/2002 | Hazelton et al. | |
| 2004/0175561 A1 | 9/2004 | Duff, Jr. | |
| 2005/0146815 A1 | 7/2005 | Donovon et al. | |
| 2005/0194944 A1 | 9/2005 | Folts et al. | |
| 2006/0077605 A1 | 4/2006 | Folkers et al. | |
| 2006/0195229 A1 | 8/2006 | Bell et al. | |
| 2007/0135970 A1 | 6/2007 | Zhou | |
| 2008/0066035 A1 | 3/2008 | Asao | |
| 2008/0247105 A1 | 10/2008 | Divan | |
| 2009/0024255 A1 | 1/2009 | Penzenstadler et al. | |
| 2009/0063680 A1 | 3/2009 | Bridges | |
| 2010/0128523 A1 | 8/2010 | Yip | |
| 2010/0198422 A1 | 8/2010 | Feng | |
| 2010/0231235 A1 | 9/2010 | Cho | |
| 2010/0244565 A1 | 9/2010 | Yoshida et al. | |
| 2010/0259100 A1 | 10/2010 | Hamstra et al. | |
| 2010/0332047 A1 | 12/2010 | Arditi et al. | |
| 2011/0074215 A1 | 3/2011 | Vartanian et al. | |
| 2011/0149618 A1 | 6/2011 | Babcock et al. | |
| 2011/0175592 A1 | 7/2011 | Huot-Marchand et al. | |
| 2011/0192838 A1 | 8/2011 | Fujita et al. | |
| 2011/0205674 A1 | 8/2011 | Divan | |
| 2011/0248790 A1 | 10/2011 | Tsvey | |
| 2011/0285362 A1 | 11/2011 | Huomo | |
| 2012/0091805 A1 | 4/2012 | Beck | |
| 2012/0169300 A1 | 7/2012 | Rouaud | |
| 2012/0287683 A1 | 11/2012 | Routimo | |
| 2013/0096724 A1 | 4/2013 | Divan et al. | |

FOREIGN PATENT DOCUMENTS

| | | |
|---|---|---|
| WO | 2005085969 A1 | 9/2005 |
| WO | 2009012399 A2 | 1/2009 |
| WO | 2013086238 A1 | 6/2013 |

OTHER PUBLICATIONS

Extended European Search Report in European Patent Application No. 12831757.5, dated Feb. 27, 2015.
International Search Report in International Application No. PCT/US2012/068316, dated Feb. 7, 2013.
International Search Report in International Application No. PCT/US2012/068307, dated Feb. 14, 2011.
Wilson, Tom, "A Comparison of AdaptiVolt™ and Line Drop Compensation Conservation Voltage Regulation Implementation Methodologies," PCS UtiliData, Dec. 2010, pp. 1-7, Spokane, WA.
International Search Report in International Application No. PCT/US2012/055619, dated Dec. 3, 2012.
Extended European Search Report in European Patent Application No. 12855569.5, dated Jul. 28, 2015.
Extended European Search Rpeort in EP Application No. 16159896.6, dated Aug. 4, 2016.

* cited by examiner

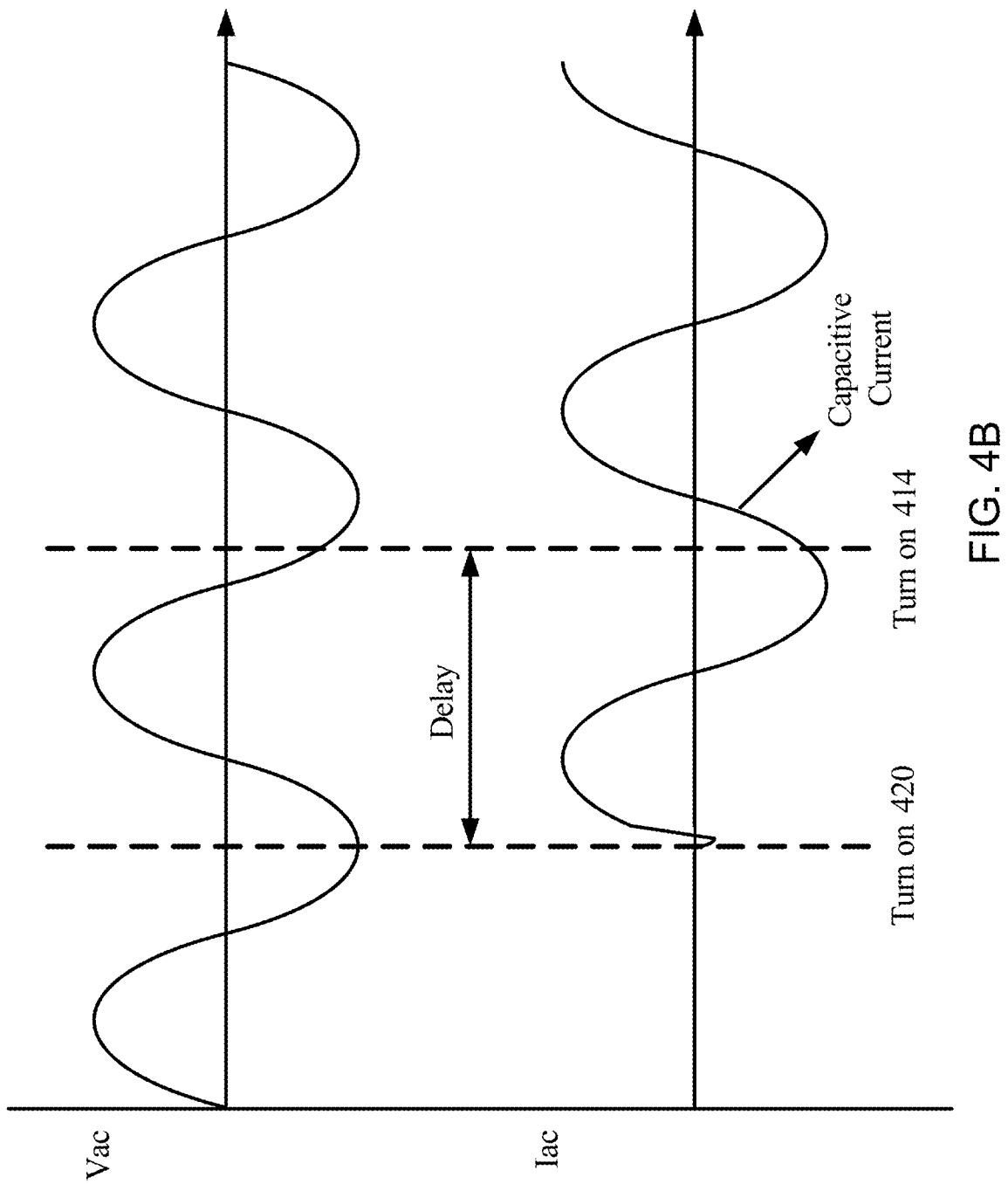

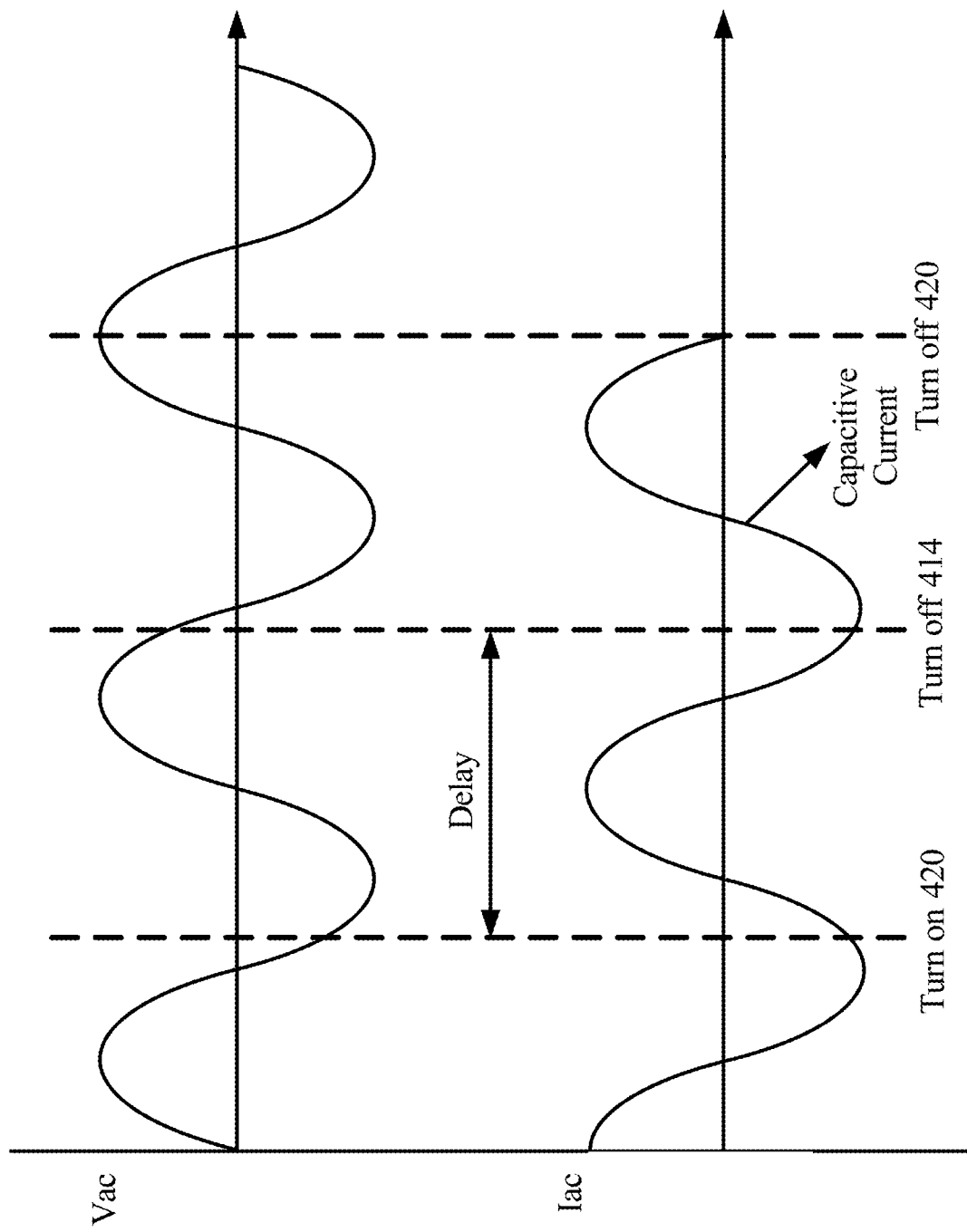

SYSTEMS AND METHODS FOR EDGE OF NETWORK VOLTAGE CONTROL OF A POWER GRID

CROSS-REFERENCE TO RELATED APPLICATIONS

The present application is a continuation of and claims the benefit of U.S. patent application Ser. No. 14/659,418, filed Mar. 16, 2015, entitled "Systems and Methods for Edge of Network Voltage Control of a Power Grid," which is a continuation-in-part of and claims the benefit of U.S. patent application Ser. No. 13/488,330, filed Jun. 4, 2012, entitled "Systems and Methods for Edge of Network Voltage Control of a Power Grid," which in turn claims the benefit of U.S. Provisional Patent Application No. 61/535,892, filed Sep. 16, 2011, entitled "Systems and Methods of a Distributed Dynamic VAR (D-DVAR) Compensator," U.S. Provisional Patent Application No. 61/567,580, filed Dec. 6, 2011, entitled "Systems and Methods for Dynamic VAR Optimization," U.S. Provisional Patent Application No. 61/579,610, filed Dec. 22, 2011, entitled "Systems and Methods for Managing Power," U.S. Provisional Patent Application No. 61/635,799, filed Apr. 19, 2012, entitled "Systems and Methods for Dynamic AC Line Voltage Regulation with Energy Saving Tracking," and U.S. Provisional Patent Application No. 61/635,797, filed Apr. 19, 2012, entitled "Systems and Methods for Fast VAR Source with Anti-Resonance Function," each of which is incorporated herein by reference in its entirety.

FIELD

The present invention(s) generally relate to power distribution grid network optimization strategies. More particularly, the invention(s) relate to systems and methods for edge of network voltage control of a power distribution grid.

BACKGROUND

The conventional approach to power distribution grid voltage control is based on techniques developed about 70 years ago, one goal of which is to control demand (either raising or lowering demand). In recent years, highly complex and expensive systems have been required to implement improved effective voltage control and conservation voltage reduction (CVR) based demand reduction, one example of which is power distribution grid voltage control. Typically, utilities operate in a narrow band of 116-124 volts, even though level 'A' service allows for a range of 114-126 volts. The difficulty in adhering to a tight regulation band arises from normal fluctuations in incoming line voltage at the substation, as well as load changes along the feeder. These changes cause the line voltage to vary, with utilities required to maintain voltage for consumers within specified bounds.

The prior art volt-ampere reactive regulation devices (VAR) devices for voltage control (referred to as voltage and VAR control devices) may be split into several categories including: 1) prior art voltage and VAR control devices with slow responding capacitors and electromechanical switches; ii) prior art voltage and VAR control devices with medium response capacitors and thyristor switched capacitors; and iii) prior art voltage and VAR control devices with power converter based VAR control using Static VAR sources or static synchronous compensators (STATCOMs). Moreover, it should be noted that four-quadrant inverters can provide a combination of bidirectional, real, and reactive power that can be used to adjust power flows.

Such prior art voltage and VAR control devices are operative/utilized on the transformer "primary" side, slow and concentrated. Moreover, capacitors in the prior art voltage and VAR control devices are mainly used for power factor control when used by customers and for voltage control when used by utilities. For power factor control, the downstream line current must be measured. Capacitors and/or inductors may be switched on or off based on the line current to realize a desired overall power factor (e.g., typically at a value of unity). In the second case of voltage control used by utilities, capacitors are controlled based on: 1) local voltage measurements; 2) other parameters such as temperature; and/or 3) dispatches communicatively received from a control center. The control center may dispatch decisions regarding capacitor control based on information received from multiple points in the network.

Most capacitors of prior art voltage and VAR control devices are switched using electromechanical switches. The electromechanical switches are limited in switching speed and by life of the switches. Many electromechanical switches are limited to 3-4 switches per day. A response time of approximately fifteen minutes is often required to enable voltage control with prior art voltage and VAR control devices. During this time, the following steps may be performed: 1) sensing voltages locally; 2) communicating the sensed voltages to a centralized control center; 3) power and/or voltage modeling of the system at the centralized control center; 4) determining to take action based on the model and perceived potential improvements; and 5) dispatching one or more commands from the centralized control center to the prior art voltage and VAR control device to switch the capacitor. More advanced Volt-VAR Optimization or VVO systems are moving to such centralized implementations so they can try to optimize the profile of voltage along an entire distribution feeder and reduce infighting between prior art voltage and VAR control devices.

SUMMARY

In accordance with one embodiment, a system may comprise a distribution power network and a plurality of loads at or near an edge of the distribution power network, each of the plurality of loads configured to receive power from the distribution power network. The system may further comprise a voltage ampere reactive (VAR) cloud network comprising a plurality of distributed controllable VAR sources (DCVS's), wherein each of the plurality of DCVS's is integrated into a customer-located asset at or proximate to each of the plurality of loads, and wherein each of the plurality of DCVS's is configured to detect a voltage proximate to the edge or near the edge of the distribution power network and make a determination to enable a VAR compensation component implemented therein to regulate the voltage.

In accordance with another embodiment, a DCVS comprises a customer-located asset module and a DCVS module operatively connected to the customer-located asset module. The DCVS module includes a shunt-connected, switch-controlled VAR source including a processor and a VAR compensation component adapted to, subsequent to detection of a voltage proximate to an edge or near an edge of a distribution power network, enable the shunt-connected, switch-controlled VAR source to determine, after a delay, whether to enable the VAR compensation component based on the proximate voltage and to adjust network VAR by controlling a switch to enable the VAR compensation component based on the determination.

In accordance with yet another embodiment, a method of controlling a DCVS comprises determining a voltage difference by comparing an actual voltage of the DCVS measured to a voltage set point of the DCVS. Additionally, the method comprises comparing the voltage difference to a predetermined threshold voltage, and setting a time constant for the DCVS if the voltage difference does not exceed the predetermined threshold voltage. Further still, the method comprises determining and setting a gain for the DCVS, and depending on whether the voltage difference is large and exceeds a zero value, removing at least one VAR source or injecting reactive power via at least one DCVS.

BRIEF DESCRIPTION OF THE DRAWINGS

FIG. 4B is a graph that depicts activating the semiconductor switch relative to the relay to engage VAR compensation in some embodiments.

FIG. 4C is a graph that depicts deactivating the semiconductor switch relative to the relay to disengage VAR compensation in some embodiments.

DETAILED DESCRIPTION

Figure 1A:
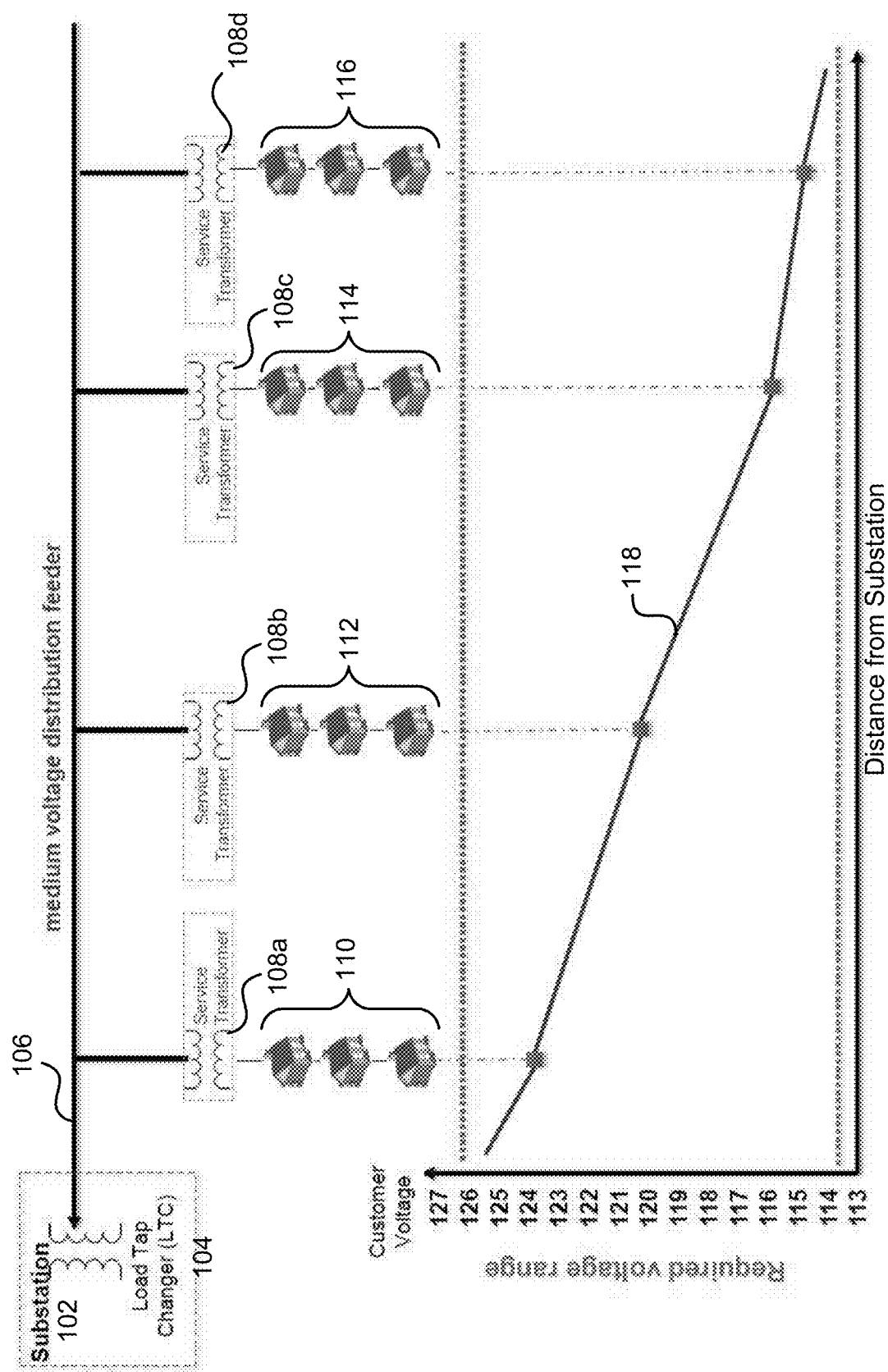
FIG. 1A depicts a typical distribution feeder fed from a single substation in some embodiments.

New requirements for distributed dynamic voltage control are emerging, driven by distributed renewable energy penetration and the need to increase grid capacity without building new lines or infrastructure. Applications such as Conservation Voltage Reduction (CVR) and Volt VAR Optimization (VVO) promise 3-5% increase in system capacity, simply by lowering and flattening the voltage profile along a distribution grid. To achieve CVR and VVO in the prior art, improvements to the power grid are slow in operation, difficult to model due to increased complexity of the overall system, require considerable back end infrastructure (e.g., modeling, and a centralized, computation and communication facility), are expensive to install in sufficient numbers to improve performance, and difficult to maintain. Further, conventional VVO schemes realize poor voltage regulation due to few control elements and poor granular response. It should be noted that the term voltage and VAR control devices, as utilized herein, can refer to devices that, in manipulating (sourcing) VARs, impacts both a local and system VAR flow, thereby impacting local and system voltages.

In various embodiments discussed herein, line voltage may be regulated at or near every customer point (i.e., at the load along a distribution power grid). For example, a utility may install a shunt-connected, switch-controlled volt-ampere reactive (VAR) source at each customer location. Each shunt-connected, switch-controlled volt-ampere reactive (VAR) source may detect a voltage proximate to the device and make a determination to enable a VAR compensation component (e.g., capacitor(s) and/or inductor(s)) to regulate voltage on the network. The plurality of shunt-connected, switch-controlled volt-ampere reactive (VAR) sources, switching independently, may operate collectively to flatten the voltage curve (e.g., voltage impact along a medium voltage distribution feeder starting from a substation) along a power network. The plurality of VAR sources may be controlled to prevent fighting between sources, while allowing connected points to reach a desired voltage set point with much higher granularity and accuracy.

If distributed VAR compensation is implemented, the utility may realize several benefits. For example, a desired voltage profile may be maintained optimally along the line even as system configuration changes, system losses may decrease, and/or system stability and reliability may be improved. New cascading grid failure mechanisms, such as Fault Induced Delayed Voltage Recovery (FIDVR) may also be avoided through the availability of distributed dynamically controllable VARs.

In various embodiments, distributed fast voltage controllers and/or compensators at or near a power network edge provides a solution that is able to act autonomously on local information with little to no infighting. This approach may remove uncertainty about the voltage variations at a range of nodes, flatten the voltage profile along the edge of the network, and allow a Load Tap Changer (LTC) to drop the voltage to the lowest level possible.

FIG. 1A depicts a typical distribution feeder 106 fed from a single substation 102 in some embodiments. Standard design practice involves the use of load tap changing (LTC) transformers 104 at substations 102, with fixed and switchable medium voltage capacitors on the feeder. FIG. 1A depicts a series of houses (i.e., loads) 110, 112, 114, and 116 that receive power from various distribution feeders coupled to the primary feeder 106 (e.g., distribution feeders separated from the primary feeder by transformers 108a-d). In the prior art, as the distance from the substation 102 increases, utility voltage 118 along the primary feeder (e.g., medium voltage distribution feeder 106) decreases.

In the prior art, load tap changers, slow acting capacitor banks, and line voltage regulators may be sporadically placed along one or more primary feeders 106 to improve voltage range. Without Conservation Voltage Reduction or CVR, the first houses 110 have a required utility voltage of approximately 124.2 volts. Houses 112 have a significantly reduced utility voltage of approximate 120-121 volts. Houses 114 further have a required voltage between 115 and 116 while houses 116 have a required voltage between 114 and 115.

Figure 1B:
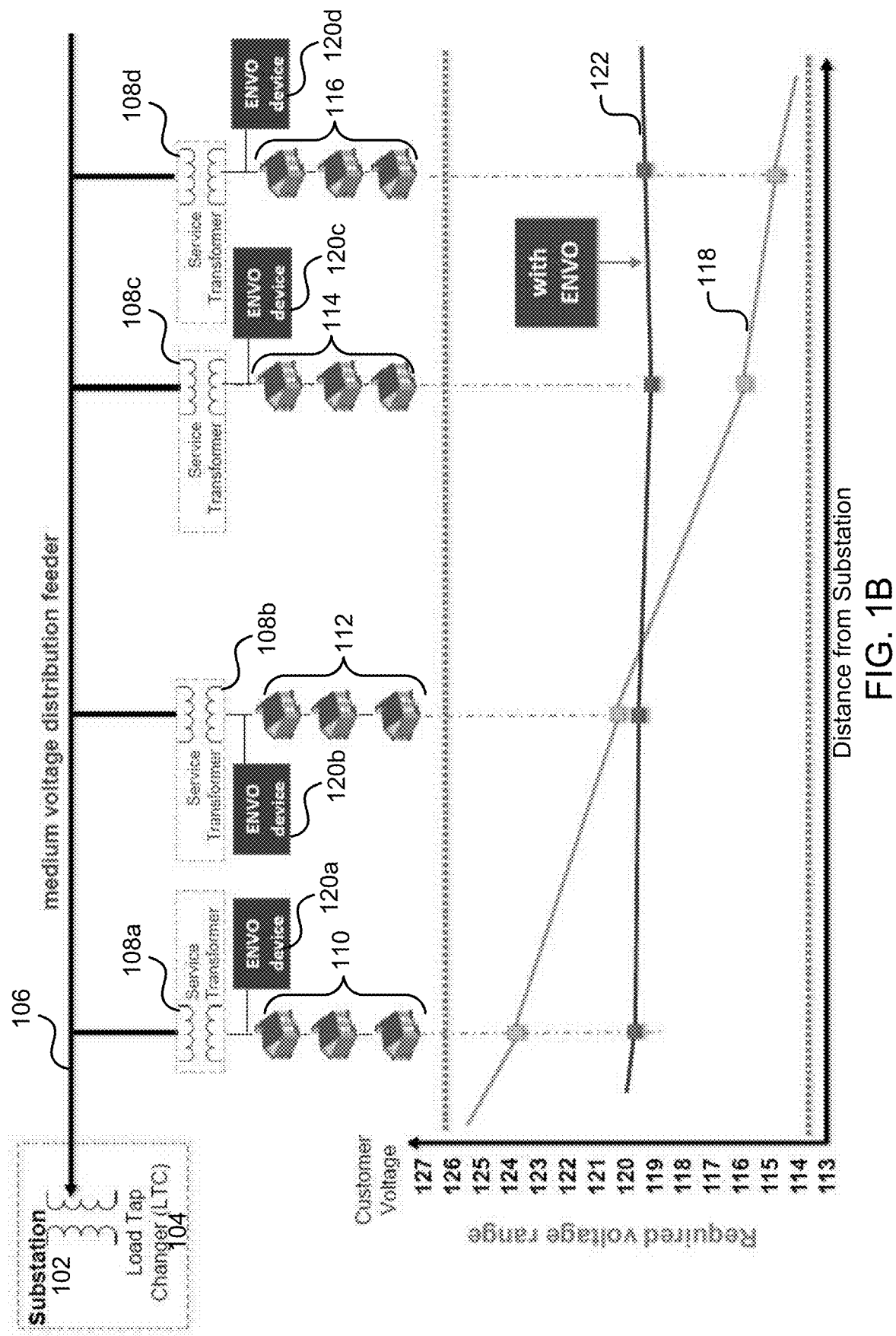
FIG. 1B depicts a distribution feeder fed from a single substation and including a plurality of edge of network voltage optimization (ENVO) devices in some embodiments.

FIG. 1B depicts a distribution feeder 106 fed from a single substation 102 and including a plurality of edge of network voltage optimization (ENVO) devices 120a-d in some embodiments. In various embodiments, VAR compensators (e.g., or any VAR source), including, for example, ENVO devices 120a-d, may be placed at or near any number of the loads (e.g., houses 110, 112, 114, and 116). As a result, the overall voltage range may be flattened along the distance from the substation 102 thereby saving energy, increasing responsiveness, and improving overall control along longer distribution feeders. In order to avoid infighting between one or more VAR sources, the action of switching (e.g., the timing of switching or the point at which VAR compensation is engaged/disengaged) may be different between all or a portion of the VAR sources.

The VAR source may each act (e.g., activate or deactivate one or more VAR components such as a capacitor and/or inductor) quickly and independently, based at least on voltages proximate to the VAR sources, respectively, to improve voltage regulation and achieve Edge of Network Volt Optimization (ENVO) (see ENVO line 122). The ENVO line 122 depicts that the voltage required for houses 110 is approximately 120 volts. Houses 112, 114, and 116, may require a reasonably flat voltage range around approximately 120 volts as well. Those skilled in the art will appreciate that the ENVO line 122 achieves a desired flattening of the required voltage range while the line indicating utility voltage 118 without VAR compensation drops precipitously.

Figure 1C:
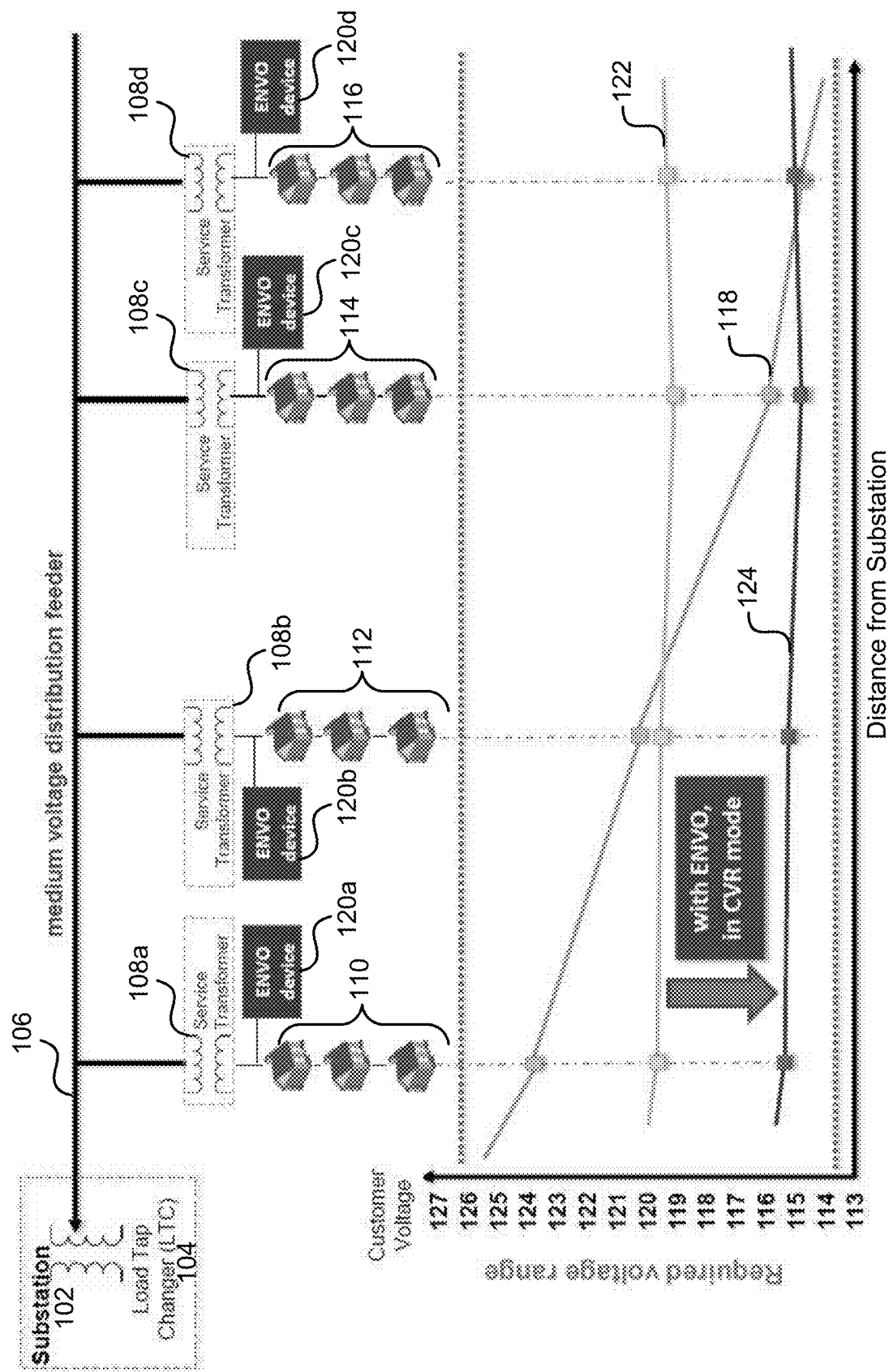
FIG. 1C depicts another distribution feeder fed from a single substation and including the plurality of ENVO devices in some embodiments.

FIG. 1c depicts another distribution feeder 106 fed from a single substation 102 and including the plurality of ENVO devices 120a-d in some embodiments. In various embodiments, the ENVO devices 120a-d may further apply Conservation Voltage Reduction (CVR) to further reduce required voltage. Line 124 represents the voltage required for houses 110, 112, 114, and 116 with ENVO devices 132a-b applying CVR. For example, line 124 (like ENVO line 122) is relatively flat. Houses 110 and 112 may require approximately 115.2 volts while houses 114 may require approximately 115 volts. Further, houses 116 may require 115.4 volts in this example. The need to improve system capacity utilization is driving utilities to implement peak demand reduction and capacity expansion using techniques such as Conservation Voltage Reduction (CVR) and Volt VAR Optimization (VVO) on non-ENVO devices. Utility companies currently apply CVR by receiving information from multiple points in the power grid, modeling the performance, modeling proposed improvements, and potentially coordinating activities of capacitor banks along the primary feeder on the medium voltage side of the transformers.

Poor controllability of preexisting voltage regulation devices presents severe challenges to managing voltage variations for system planners and operators. In particular, poor controllability limits the length of a distribution feeder that can be managed. Poor controllability also limits the load variability that can be handled, while keeping all voltages at end-user locations within bounds.

Further, new trends are seeing an increased use of sectionalizers with breaker/reclosers to isolate faulted segments and to restore power to other non-faulted line segments, resulting in a significant change in the network, and voltage profiles. Increased use of network reconfiguration also makes the task of placing capacitor banks and LTCs at fixed locations more problematic, as the placement has to meet the needs of multiple configurations. Moreover, the increasing use of distributed generation resources, such as roof top photovoltaic (PV) arrays can result in a reversal of power flows locally, with higher line voltages farther away from the substation, and a breakdown of any voltage regulation algorithm that was implemented.

Those skilled in the art will appreciate that VAR sources at or near the edge of the power grid may individually react and correct for higher line voltages that may be a result of PV arrays (e.g., green energy improvement such as solar panels). These VAR sources may allow both the customer and the network to enjoy the benefits of green power without significantly redesigning or altering the grid to accommodate the change. Since the edge of the network is quickly and independently reactive to events or changes along the power grid, a centralized algorithm, containing a complete state of the grid including all variables that affect load and input, for slow voltage control and regulation may also become unnecessary.

Figure 2:
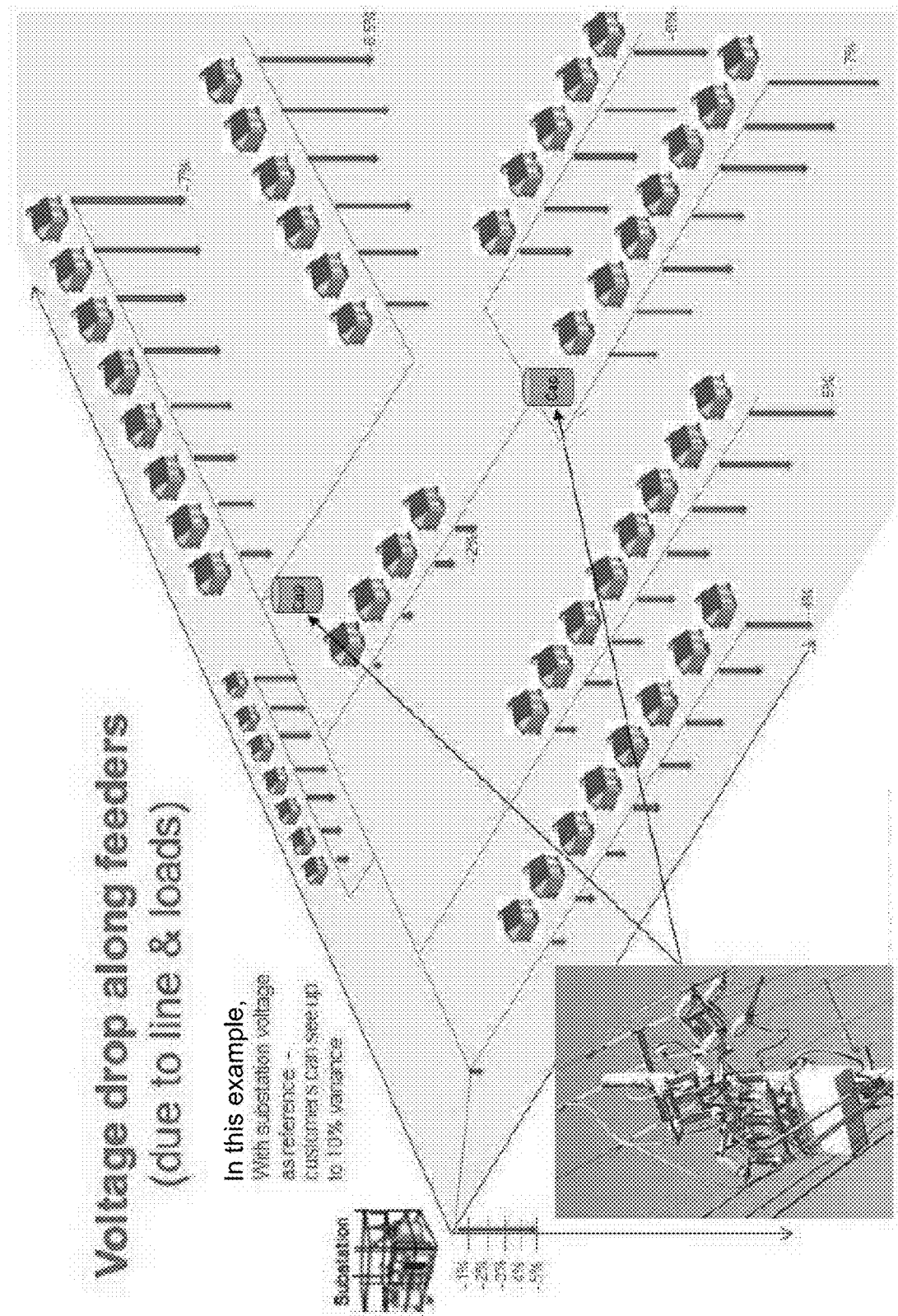
FIG. 2 is a diagram depicting voltage drop along feeders due to loads without the implementation of capacitor banks in the prior art.

FIG. 2 is a diagram depicting voltage drop along feeders due to loads without the implementation of capacitor banks in the prior art. As depicted in FIG. 2, the length of the feeder lines from the substation is limited by the voltage drop. In this example, there is a 10% variance in available voltage. In the prior art, the objective is to keep voltage within a broad band. As few control handles are available, only very coarse control is possible. Ideally, the voltage should be closely regulated to specifications all along the line, including in the presence of dynamic fluctuations. With few sensors, few correction points, slow communication, and a limited number of operations, prior art control is unable to meet the dynamic control requirements of the new and future distribution power grid.

By utilizing sporadically placed capacitor banks, voltage regulation may be implemented to flatten the available voltage range and reduce losses. The capacitor banks may operate based on temperature, for example, or based on commands from a centralized control facility. When based on temperature, for example, to avoid interactions and to maximize switch life of the capacitor banks, switching to activate or deactivate one or more capacitors is infrequent and slow. Capacitor banks that are operated under the control a centralized facility may be individually commanded to avoid interactions.

In spite of the attempts of controlling voltage through CVR, drops along the length of the feeder are only marginally affected by the activation of the capacitor banks. In these examples, the capacitor bank may be switched three-to-four times per day. The process maybe slow as well. In one example, it may take up to fifteen minutes to: 1) detect conditions; 2) provide the conditions to a centralized facility; 3) the centralized facility model conditions and make a determination to enable or disable a capacitor bank; 4) provide a command to one or more capacitor banks; and 5) receive the command and perform the switching. Even if one or more of these disadvantages were overcome, there may still be infighting between multiple devices attempting to control voltage. For example, multiple thyristor switched capacitors may fight with each other as each device attempts to compensate for a power state of the power network. As the thyristor switched capacitors work at cross purposes, they tend to overcompensate and undercompensate while constantly reacting to the corrections of other thyristor switched capacitors on the power network.

Figure 3A:
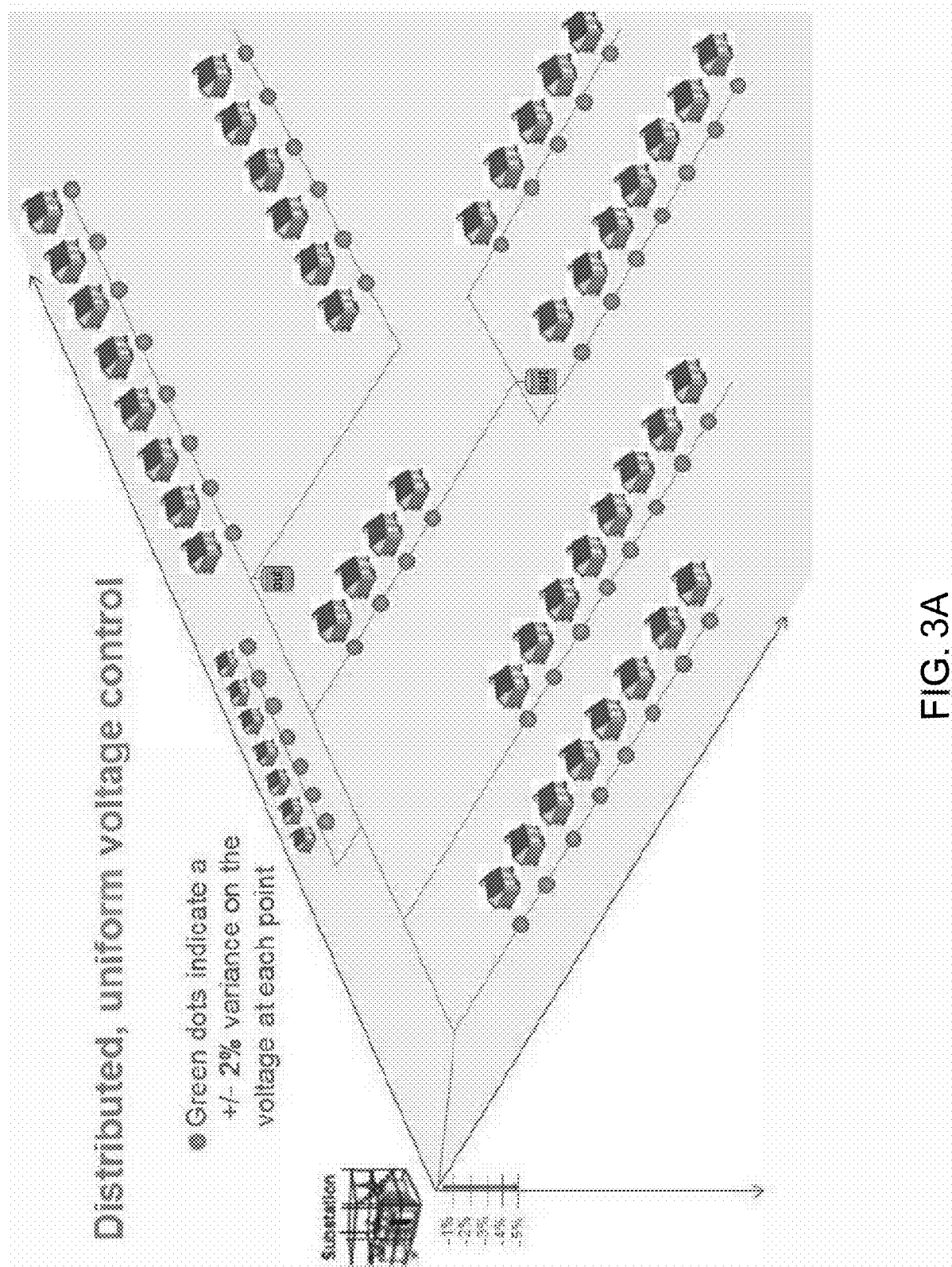
FIG. 3A is a diagram depicting a power distribution grid with shunt-connected, switch-controlled VAR sources at or near each load in some embodiments.

FIG. 3A is a diagram depicting a power distribution grid with shunt-connected, switch-controlled VAR sources at or near each load in some embodiments. Loads are depicted as houses or residences. In addition to houses or residences, those skilled in the art will appreciate that the loads can be any loads including, but not limited to, commercial or industrial establishments. A load is any component, circuit, device, piece of equipment or system on the power distribution network which consumes, dissipates, radiates or otherwise utilizes power. A power distribution grid is an electrical grid, such as an interconnected network, for delivering electricity from suppliers to consumers.

In this example, voltage may be regulated at or near the edge of the network thereby allowing edge of network volt optimization (ENVO). An edge of the network is the portion of a power distribution network that is proximate to the load that is to receive power. In one example, the load is a customer load. An edge of the network may be on the low-voltage side of a transformer. For example, the edge of the network may comprise one or more feeder lines configured to provide power to multiple customer loads (e.g., housing residences).

Figure 3B:
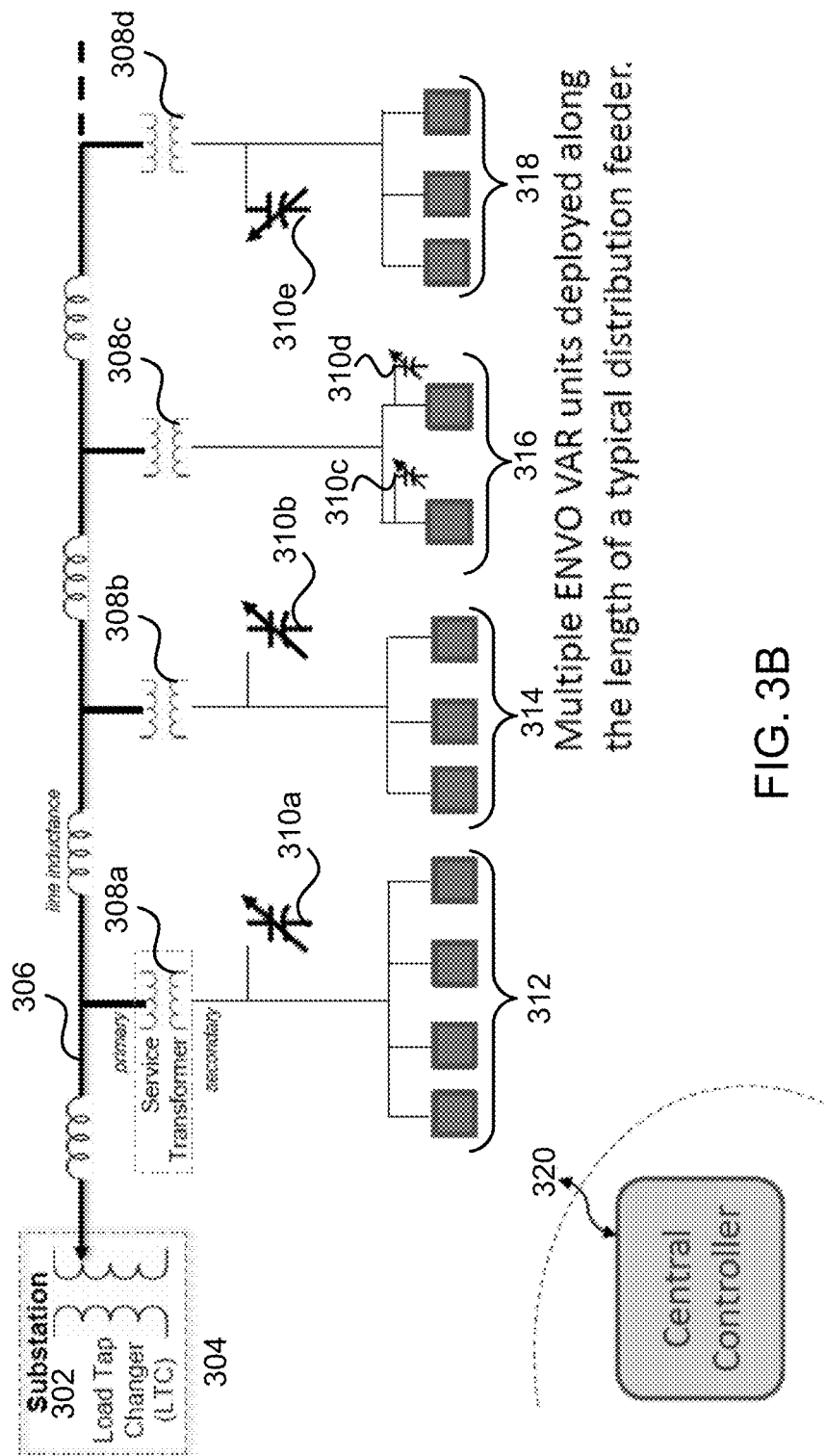
FIG. 3B is another diagram depicting a power distribution grid with shunt-connected, switch-controlled VAR sources at or near each load in some embodiments.

In FIGS. 3a and 3b, a substation provides power to residences (e.g., loads) over a series of regional distribution feeders. Each residence and shunt-connected, switch-controlled VAR source is coupled to the power distribution grid. In various embodiments, each shunt-connected, switch-controlled VAR source is configured to detect voltage and adjust network volt-ampere reactive (VARs) based on the detected voltage. In one example, the shunt-connected, switch-controlled VAR source enables a capacitor and/or an inductor to change (e.g., reduce or eliminate) the reactive power of the power distribution grid thereby regulating voltage of the network (i.e., network voltage). The change in reactive power may reduce the voltage drop along the distribution feeder.

As discussed regarding FIGS. 1A-1C, shunt-connected, switch-controlled VAR sources may be placed at or near any number of the loads. As a result, the overall voltage range may be flattened along the distance from the substation thereby saving energy, increasing responsiveness, and improving overall control along longer distribution feeders. The VAR source may each act (e.g., activate or deactivate one or more VAR components such as a capacitor and/or inductor) quickly and independently, based at least on voltages proximate to the VAR sources, respectively, acting collectively to improve voltage regulation and achieve ENVO. FIG. 3A depicts that the voltage distribution drop is flatter, for example a +/−2% variance across the network depicted in FIG. 3B without the implementation of the capacitor banks.

FIG. 3B is another diagram depicting a power distribution grid with shunt-connected, switch-controlled VAR sources at or near each load in some embodiments. In FIG. 3B, a substation 302 with a load top changer (LTC) 304 feeds a distribution feeder 306 with line inductance throughout the distribution feeder 306. Loads 312, 314, 316, and 318 receive power from the distribution feeder 306 via transformers 310a-d respectively. Further, each subfeeder between a transformer and the loads may include one or more ENVO devices 310a-e that may be configured to act as one or more VAR compensators. In various embodiments, multiple ENVO devices (e.g., ENVO VAR units) may be deployed along the length of a typical distribution feeder to flatten the required voltage and respond to network conditions.

In various embodiments, an optional central controller 320 may communicate with one or more of the ENVO devices 310a-e to receive sensor information and/or behavior information regarding the actions of one or more ENVO devices 310a-e. In some embodiments, one or more of the ENVO devices 310 may include a communication interface configured to communicate with each other and/or the central controller 320. The central controller 320 may, in some embodiments, provide one or more set points (discussed herein) that may assist in controlling when one or more of the ENVO devices 310 become active (e.g., based on comparing one or more set points to voltage of a portion of the power distribution network. The central controller 320 is further discussed herein.

Figure 4A:
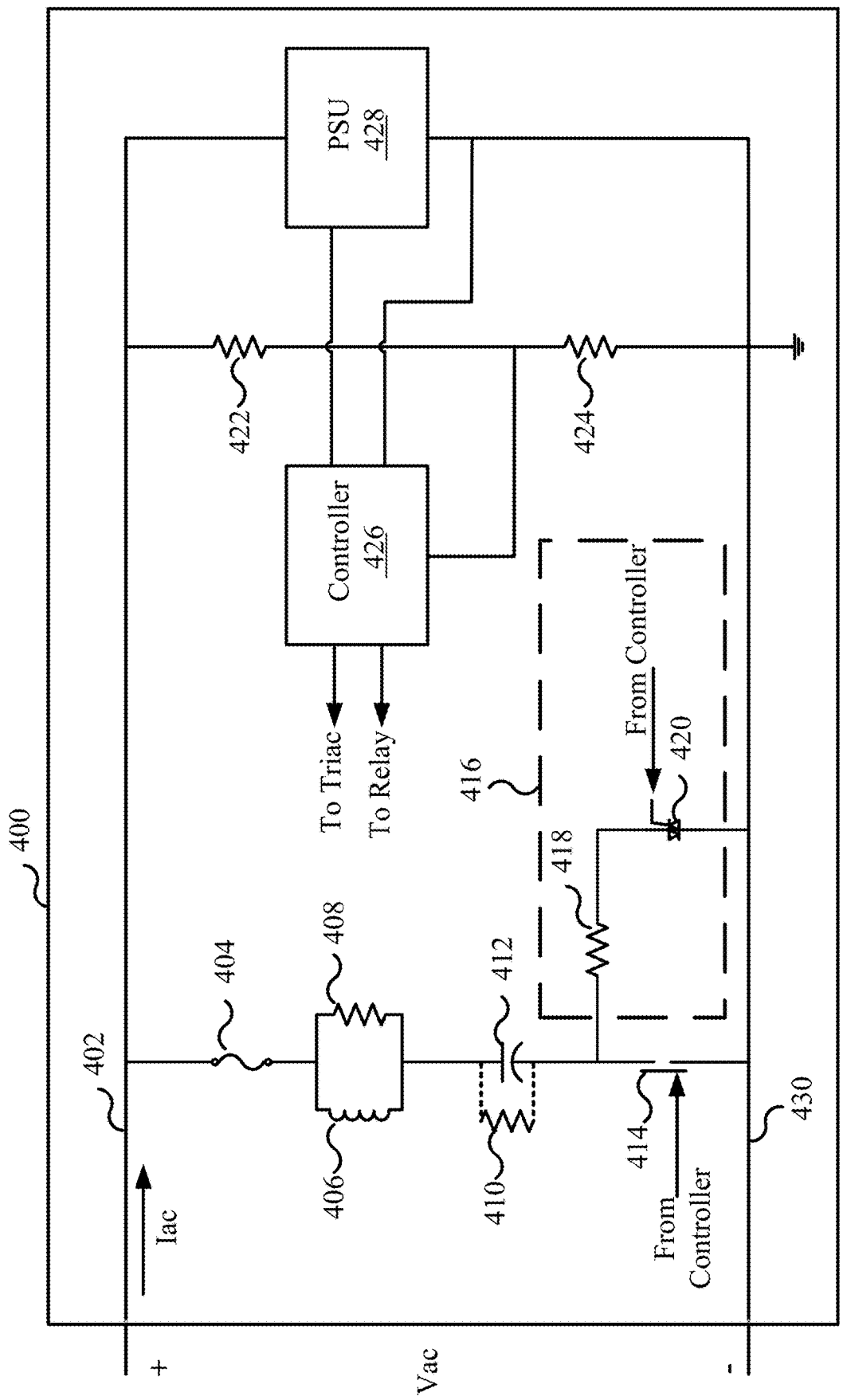
FIG. 4A is a circuit diagram of an exemplary switch-controlled VAR source which may be connected in shunt in some embodiments.

FIG. 4A is a circuit diagram of an exemplary switch-controlled VAR source 400 which may be connected in shunt in some embodiments. The switch-controlled VAR source 400 may be a part of a large number of switch-controlled VAR sources 400 at or near an edge of the power distribution grid (i.e., the power network).

At a high level, the switch-controlled VAR source 400 comprises a capacitor 412 (e.g., a VAR compensation component) that is controlled through a relay 414 in parallel with a semiconductor switch 416 (e.g., triac 420—NTC 418 is optional). A processor, such as controller 426, may control the relay 414 and semiconductor switch 416 based on voltage. For example, the controller 426 may detect voltage proximate to the switch-controlled VAR source 400 (e.g., through line 402). Based on the detected voltage, the controller 426 may enable or disable the capacitor by controlling the relay 414 and semiconductor switch 416. As discussed herein, the relay 414 and semiconductor switch 416 may work together to protect and prolong the life of various components of the switch-controlled VAR source 400 during switching operations.

The exemplary switch-controlled VAR source 400 comprises lines 402 and 430, fuse 404, inductor 406, resistors 408, 410, 418, 422, and 424, capacitor 412, relay 414, a switch 416 comprising an optional NTC 418 and triac 420, controller 426, and power supply unit (PSU) 428. Lines 402 and 430 may be coupled to a feeder such as a feeder on the low voltage side of a transformer. In one example, lines 402 and 430 may be coupled to any line or feeder configured to provide power to one or more loads (e.g., on or at the edge of a network). In some embodiments, the switch-controlled VAR source 400 is proximate to a residential or commercial load. For example, the switch-controlled VAR source 400 may be within a smart meter, ordinary meter, or transformer within proximity to a load. Those skilled in the art will appreciate that the switch-controlled VAR source 400 may be within any grid asset.

The fuse 404 is configured to protect the switch-controlled VAR source 400 from voltage spikes, transients, excessive current, or the like. The fuse 404 may be any fuse and may be easily replaceable. In some embodiments, if the fuse 404 short circuits and the switch-controlled VAR source 400 is disconnected from the power distribution network, the power delivered to the residential and/or commercial loads may not be interrupted.

The inductor 406 and resistor 408 may act as an L-R snubber to control peak inrush currents (e.g., during startup conditions) and to manage resonance. In some embodiments, the inductor 406 and resistor 408 may prevent wear on the capacitor 412 and/or the other circuits of the switch-controlled VAR source 400 caused by changes in voltage or power received from the line 402 and/or activation or deactivation of the switch-controlled VAR source 400.

Those skilled in the art will appreciate that, in some embodiments, the inductor 406 and resistor 408 may reduce susceptibility of the capacitor 412 to harmonic resonance. In various embodiments, the switch-controlled VAR source 400 does not comprise the inductor 406 and/or the resistor 408.

The capacitor 412 may be any capacitor configured to compensate for reactive power (e.g., VARs). In various embodiments, the relay 414 and/or the semiconductor switch 416 may form a switch that completes the circuit thereby allowing the capacitor 412 to influence reactive power of the network. In one example, if the relay 414 is open and the triac 420 (of the semiconductor switch 416) is deactivated, the capacitor 412 may be a part of an open circuit may, therefore, have no effect on the power distribution grid or the load.

The resistor 410 is an optional bleed resistor. In some embodiments, when the capacitor is disabled or otherwise disconnected by the switch (e.g., via relay 414 and/or semiconductor switch 416), the resistor 410 may potentially receive energy from the capacitor 412 thereby allowing the energy state of the capacitor 412 to decrease.

The relay 414 may be used to reduce losses when the semiconductor switch 416 is active. The semiconductor switch 416 may be used to provide precise and fast response at turn on and turn off. Those skilled in the art will appreciate that any appropriately tested relay (e.g., a tested electromechanical relay) may be used.

The triac 420 of the semiconductor switch 416 is a gate-controlled thyristor in which current is able to flow in both directions. The relay 414 and/or the triac 420 may perform as one or more switches. For example, the controller 426 may open the relay 414 and deactivate the triac 420 to create an open circuit to disconnect the capacitor 412.

Those skilled in the art will appreciate that any switch may be used. For example, a switch S, such as an IGBT, thyristor pair, or thyristor/diode arrangement may also be used. In another example, a mosfet or IGBT may be used with a diode in parallel to control the capacitor 412.

Those skilled in the art will appreciate that the relay 414 and the triac 420 may work together to preserve the life of all or some of the components of the switch-controlled VAR source 400. The controller 426 may be configured to control the relay 414 and the triac 420 to switch off the circuit in a manner that avoids transients or other undesired power characteristics that may impact the lifespan of the circuit. For example, the controller 426 may ensure that the relay 414 is open (e.g., instruct the relay 414 to open if the relay 414 is closed) before instructing the triac 420 to deactivate (e.g., ½ cycle later). This process may prevent sparking or arcing across the relay 414 and, further, may preserve the life of the relay 414. In some embodiments, the triac 420 may be switched on and, after a sufficient delay, the relay 414 may be closed. The controller 426 may then instruct the relay 414 to open thereby protecting the one or more components of the circuit.

In various embodiments, the switch-controlled VAR source 400 comprises the relay 414 but not the semiconductor switch 416. In one example, the controller 426 may instruct the relay 414 to open or close thereby enabling or deactivating the capacitor 412. In other embodiments, the switch-controlled VAR source 400 comprises the semiconductor switch 416 but not the relay 414. The controller 426 may similarly control the triac 420 to enable or disable the capacitor 412.

The optional resistor 418 may be a negative temperature coefficient (NTC) resistor or thermistor. The NTC resistor 418 is a type of resistor whose resistance may vary with temperature. By controlling the NTC resistor 418, the triac 420 may be activated or deactivated without waiting for a zero voltage crossing of the AC power from the line 402 allowing insertion of the VAR source with minimal delay. For example, without the NTC resistor 418, the triac 420 may only be activated when AC voltage crosses zero volts. The NTC resistor 418 may be configured such that the triac 420 may be activated at any point with little or no undesirable effect (e.g., minimal or reduced inrush).

Resistors 422 and 424 may attenuate the signal from the line 402 to be received by the controller 426.

The controller 426 may be configured to determine a proximate voltage based on the voltage of line 402 and may enable or disable the capacitor 412. In various embodiments, the controller 426 is a processor such as a microprocessor and/or a Peripheral Interface Controller (PIC) microcontroller that may detect voltage of the feeder 402.

In some embodiments, based on the voltage, the controller 426 may control the relay 414 and/or the triac 420 to open or close the circuit thereby enabling or disabling the capacitor 412. For example, if the voltage detected is not desirable, the controller 426 may enable the capacitor 412 by commanding the triac 420 to activate and/or the relay 414 to close. The capacitor 412 may then compensate for reactive power (e.g., regulate network voltage).

Those skilled in the art will appreciate that there may be a delay in the response of relay 414 (e.g., the relay 414 may be an electromechanical relay that is slow to react when compared to the triac 420). In this example, the command to open the relay 414 may be sent in advance of the command to deactivate the triac 420.

One of the most common failure mechanisms for capacitors on the grid is overvoltage. In some embodiments, the relay 414 and triac 420 may be deactivated when overvoltage is detected thereby protecting the capacitor(s).

In case of plurality of individual VAR sources inside a single unit, the usage of the switch controlled individual VAR sources will be uniformly distributed over time. The decision to turn on a specific VAR source will be determined by the on-board processor based on historical operational data. The VAR source which has been used the least amount of time will be given preference over the ones which have been used more. This method ensures that no single VAR source will be exercised more than others thereby improving reliability and life of the unit.

The controller 426 may delay activation of the switch (e.g., relay 414 and semiconductor switch 416). In various embodiments, a multitude of switch-controlled VAR sources 400 which react to voltages within a power grid. In order to prevent infighting among the switch-controlled VAR sources 400, one or more of the devices may delay enabling or disabling the VAR compensation component (e.g., capacitor 412). In various embodiments, the controller of each switch-controlled VAR source 400 includes a different delay. As a result, each switch-controlled VAR source 400 may activate the switch to regulate voltage at a different time thereby giving each device time to detect voltage changes that may result from one or more switch-controlled VAR sources 400.

Those skilled in the art will appreciate that the delay may be set during manufacture of the switch-controlled VAR source 400 or may be uploaded from a centralized communication facility. The delay may be randomly set for each different switch-controlled VAR source 400.

The power supply unit (PSU) may adapt the power to be suitable to the controller 426. In some embodiments, the controller 426 is supplied from power supplied by the line 402, batteries, or any other power source. The PSU 428 may be any power supply.

Although FIG. 4A depicts the line coupled to the resistor 422 as being on the unprotected side of the fuse 404, those skilled in the art will appreciate that the fuse 404 may protect the controller 426 and PSU 428. For example, the resistor 422 may be coupled to the line 402 via the fuse 404. In particular, the fuse 404 may be connected in series with a thermal fuse 404a, which in turn may be thermally coupled to a metal oxide varistor (MOV) 407 to protect the individual VAR source 400 against any overvoltage. In the event of an overvoltage, the MOV 407 will clamp the voltage. If the event persists for a longer duration, the MOV 407 will overheat and cause the thermal fuse 404a to open up. This way, the individual VAR source 400 is protected from catastrophic failures. Further, isolation of the individual VAR source 400 (should failure occur) allows for the normal operation of other sources, if present in the unit, thereby ensuring high reliability of the unit.

In various embodiments, the switch-controlled VAR source 400 may operate both dynamically and autonomously to regulate voltage and/or compensate for grid faults. Those skilled in the art will appreciate that the switch-controlled VAR source 400 may adjust reactive power and thus the network voltage based on detected voltage without detecting or analyzing current. In some embodiments, load current information can be derived from an additional current sensor, or from the smart meter.

In some embodiments, the switch-controlled VAR source 400 may comprise an inductor which may be used to adjust voltage. For example, one or more inductors may be in place of capacitor 412. In another example, one or more inductors may be in parallel with the capacitor 412. The inductor(s) may be coupled to the fuse 404 (or a different fuse) and may be further coupled to a separate switch. For example, the inductor(s) may be coupled to a relay in parallel with a triac (or mosfet or IGBT) which may perform switching similar to the relay 414 and the semiconductor switch 416. The controller 426 may enable the inductor and disable the capacitor 412 by enabling one switch and creating an open circuit with the other. Similarly, the controller 426 may disable the inductor and enable the capacitor 412 or, alternately, disable both. Those skilled in the art will appreciate that the triac associated with the inductor may also be coupled to an NTC resistor to allow the triac to be deactivated at any time.

The switch-controlled VAR source 400 may be shunt-connected to the power distribution grid. In one example, the switch-controlled VAR source 400 is coupled in shunt via conductive lines 402 and 430 at or proximate to a residence or other commercial load. A shunt connection may be the connection of components within a circuit in a manner that there are multiple paths among which the current is divided, while all the components have the same applied voltage.

In one example, a feed line may extend from a transformer to one or more loads (e.g., residences). The feeder may also be coupled with a switch-controlled VAR source 400 in shunt. In some embodiments, if the switch-controlled VAR source 400 fails or was otherwise inoperative, the delivery of power by the power distribution grid is not interrupted because of the shunt connection (e.g., even if the connection to the switch-controlled VAR source 400 became an open circuit, there may be no interruption of power between the transformer and the one or more loads along the feed line).

In various embodiments, the switch-controlled VAR source 400 may be collocated inside or with a utility meter (e.g., smart meter), so that installation can be piggybacked, saving the utility in total installation and reading costs. The switch-controlled VAR source 400 may leverage a communication link inside a smart meter to communicate with the utility, take VAR dispatch or voltage set-point commands, and/or inform the utility of malfunction. Multiple switch-controlled VAR sources 400 may be collocated in a common housing and can be mounted on another grid asset, such as a pole-top or pad-mount transformer. This may allow lower cost VAR compensation, reduce the cost of a communication link, and allow additional value to be derived, such as assessing status and life expectancy of the asset.

In various embodiments, a plurality of switch-controlled VAR sources may each comprise a communication module. A communication module is any hardware configured to communicate wirelessly or by wire with one or more digital devices or other shunt-connected, switch-controlled VAR sources. The communication module may comprise a modem and/or an antenna.

One or more of the switch-controlled VAR sources may receive one or more set points with which to compare against voltage to assist in the determination to engage the VAR compensation component. A set point may be a pre-determined value to improve voltage regulation. The processor of switch-controlled VAR source may determine whether to adjust voltage based on the comparison of the proximate voltage to the set points. Those skilled in the art will appreciate that the set points may be different for different switch-controlled VAR sources.

For example, the switch-controlled VAR source may compare detected voltage of a feeder (e.g., proximate voltage) to one or more set points to make the determination of whether to activate the capacitor based on the comparison. For example, if the detected voltage is higher than a previously received set point, the switch-controlled VAR source may disable an otherwise active capacitor to reduce voltage. Alternately, if the voltage is lower than a previously received set point, the switch-controlled VAR source may capacitor in order to increase voltage.

In some embodiments, a communication facility may dispatch and/or update one or more set points. The switch-controlled VAR sources may communicate via a cellular network, power line carrier network (e.g., via the power grid), wirelessly, via near-field communications technology, or the like. The communication facility may update set points of any number of switch-controlled VAR sources at any rate or speed. For example, the communication facility may update set points based on changes to the grid, power usage, or any other factors.

In some embodiments, one or more of the switch-controlled VAR sources may both receive and provide information. For example, one or more of the switch-controlled VAR sources may provide voltage information, current information, harmonic information, and/or any other information to one or more communications facilities (e.g., digital devices).

The information detected, received, or otherwise processed by one or more of the switch-controlled VAR sources may be tracked and assessed. For example, voltage and/or other power information may be tracked by the VAR source or a centralized facility to determine usage rates and identify inconsistent usage. A history of expected usage may be developed and compared to updated information to identify changes that may indicate theft, failure of one or more grid components, or deteriorating equipment. In some embodiments, one or more switch-controlled VAR sources may provide information to monitor aging equipment. When changes to voltage or other information indicates deterioration or degradation, changes, updates, or maintenance may be planned and executed in advance of failure.

Those skilled in the art will appreciate that the controller of the switch-controlled VAR source may enable or disable an inductor. In some embodiments, as discussed herein, the switch-controlled VAR source may comprise an inductor and a capacitor in parallel. In some examples, based on the comparison of the detected voltage to one or more received set points, the controller of the shunt-connected, switch-controlled VAR source may enable or disable the inductor and the capacitor independently.

FIG. 4B is a graph that depicts activating the semiconductor switch relative to the relay to engage VAR compensation in some embodiments. As discussed herein, when activating the switch-controlled VAR source 400, the controller 426 may be configured to activate the triac 420 prior to activating the relay 414. In some embodiments, the controller 426 may activate the relay 414 following a predetermined delay. The delay may be any delay. In one example, the controller 426 may receive a predetermined delay (e.g., as software or firmware) during calibration or installation either before or after manufacture of the switch-controlled VAR source 400.

As depicted in FIG. 4B, the triac 420 may be activated when the voltage is low, and/or the capacitive current is approximately 0. After a delay which may be, for example, approximately a cycle, the relay 414 may be closed. Those skilled in the art will appreciate that, with the NTC resistor 418, the triac 420 may be activated at any time. Further, the relay 414 may be closed at any time after the triac 420 is active (i.e., the delay may be any length of time).

FIG. 4C is a graph that depicts deactivating the semiconductor switch relative to the relay 414 to disengage VAR compensation in some embodiments. As discussed herein, when deactivating the switch-controlled VAR source 400, the controller 426 may be configured to ensure that the relay 420 is closed prior to deactivating the triac 420. The controller 426 may subsequently deactivate (open) the relay 420. In some embodiments, the controller 426 may deactivate the relay triac 414 following a predetermined delay. The delay may be any delay which may be software or firmware received during calibration or installation.

As depicted in FIG. 4C, the relay 420 may be closed at any time. In some embodiments, the controller 426 confirms that the relay 420 is closed. If the relay 420 is open, the controller 426 may control the relay 420 to close. After a delay (e.g., after approximately a cycle or any time), the controller 426 may deactivate the triac 420. Those skilled in the art will appreciate that the triac 420 may be deactivated at any point. It should be further noted that the controller 426 may control the relay 414 to open after the triac 420 is activated. In some embodiments, the controller 426 controls the relay 414 to open after a predetermined delay. The delay may be equal or not equal to the delay between closing the relay and deactivating the triac 414.

Figure 5A:
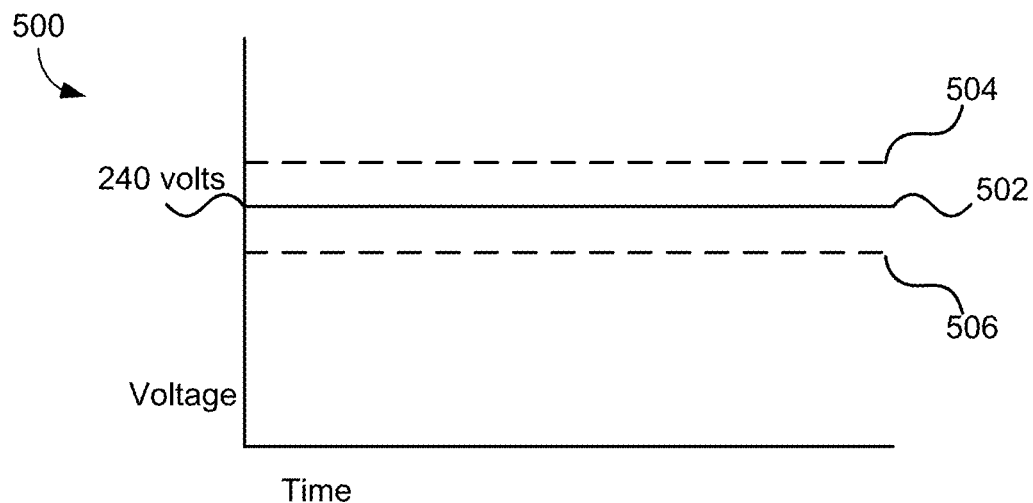
FIGS. 5A and 5B are graphs that depict a desired voltage range in relation to set points in some embodiments.
Figure 5B:
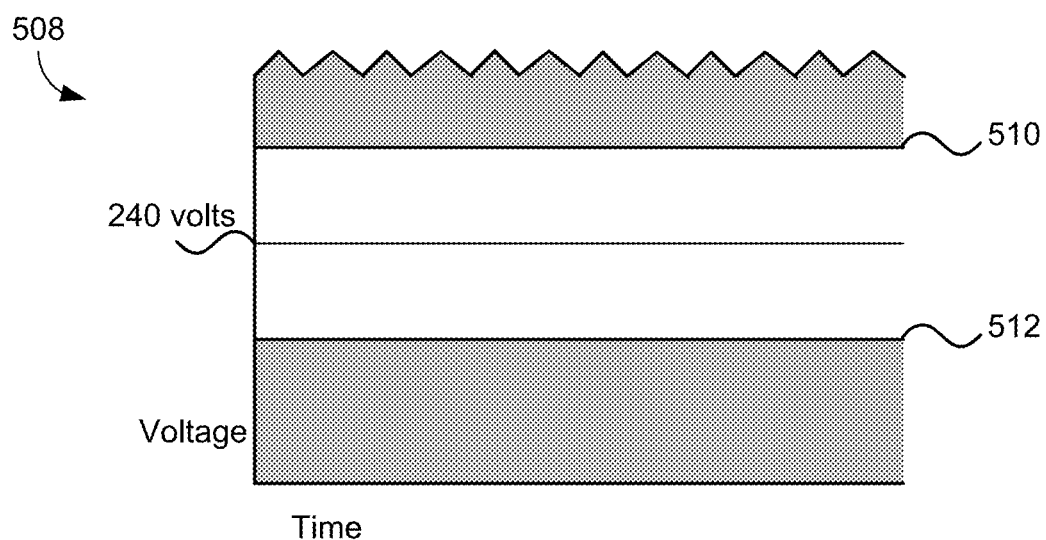

FIGS. 5a and 5b are graphs 500 and 508 that depict a desired voltage range in relation to set points in some embodiments. In various embodiments, a switch-controlled VAR source may comprise a single set point 502 (e.g., 240 volts). The switch-controlled VAR source may be configured to adjust voltage (e.g., through controlling the VAR compensation component) by comparing the detected voltage to the set point 502. Threshold 504 and 506 may identify an allowed voltage range (e.g., +/−2 volts) before the switch-controlled VAR source may enable or disable the VAR compensation component.

Those skilled in the art will appreciate that the thresholds 504 and 506 may be equal or unequal. Further, the thresholds 504 and 506 may change over time (e.g., through an algorithm that changes based on time of day, season, temperature, voltage, current, rate of change in detected voltage, or the like).

FIG. 5B is a graph depicting voltage over time and identifying set points 510 and 512 in some embodiments. Set points 510 and 512 bracket the desired "ideal" voltage (e.g., 240 volts). In various embodiments, a switch-controlled VAR source may detect a proximate voltage and compare the detected voltage to set points 510 and 512. If the voltage is higher than set point 510 or lower than set point 512, the switch-controlled VAR source may enable/disable a VAR compensation component or otherwise regulate the voltage to make corrections. Although the impact of one switch-controlled VAR source may not change the network voltage significantly, multiple VAR sources operating autonomously to change the network voltage may regulate the voltage over multiple points. As such, a limited change by many devices may create significant efficiencies and improvements in distribution with limited additional cost.

In various embodiments, one or more of the switch-controlled VAR sources do not have communication modules but rather may comprise set points previously configured at manufacture. In other embodiments, one or more of the switch-controlled VAR sources comprise communication modules and, as a result, set points may be altered or updated by other switch-controlled VAR sources or one or more communication facilities.

In some embodiments, one or more of the switch-controlled VAR source may comprise regulation profiles. A regulation profile may comprise a policy that changes one or more set points based on time, proximate conditions, or usage in order to improve conservation. If usage is likely to spike (e.g., based on heat of the day, business loads, residential loads, or proximity to electric car charging facilities), a regulation profile may adjust the set points accordingly. As a result, set points may be changed depending upon sensed usage, voltage changes, time of day, time of year, outside temperature, community needs, or any other criteria.

Those skilled in the art will appreciate that one or more of the switch-controlled VAR sources may receive regulation profiles at any time over the communications modules. In some embodiments, one or more of the switch-controlled VAR sources may not comprise a communication module but may still comprise one or more regulation profiles which may have been previously configured.

Figure 6:
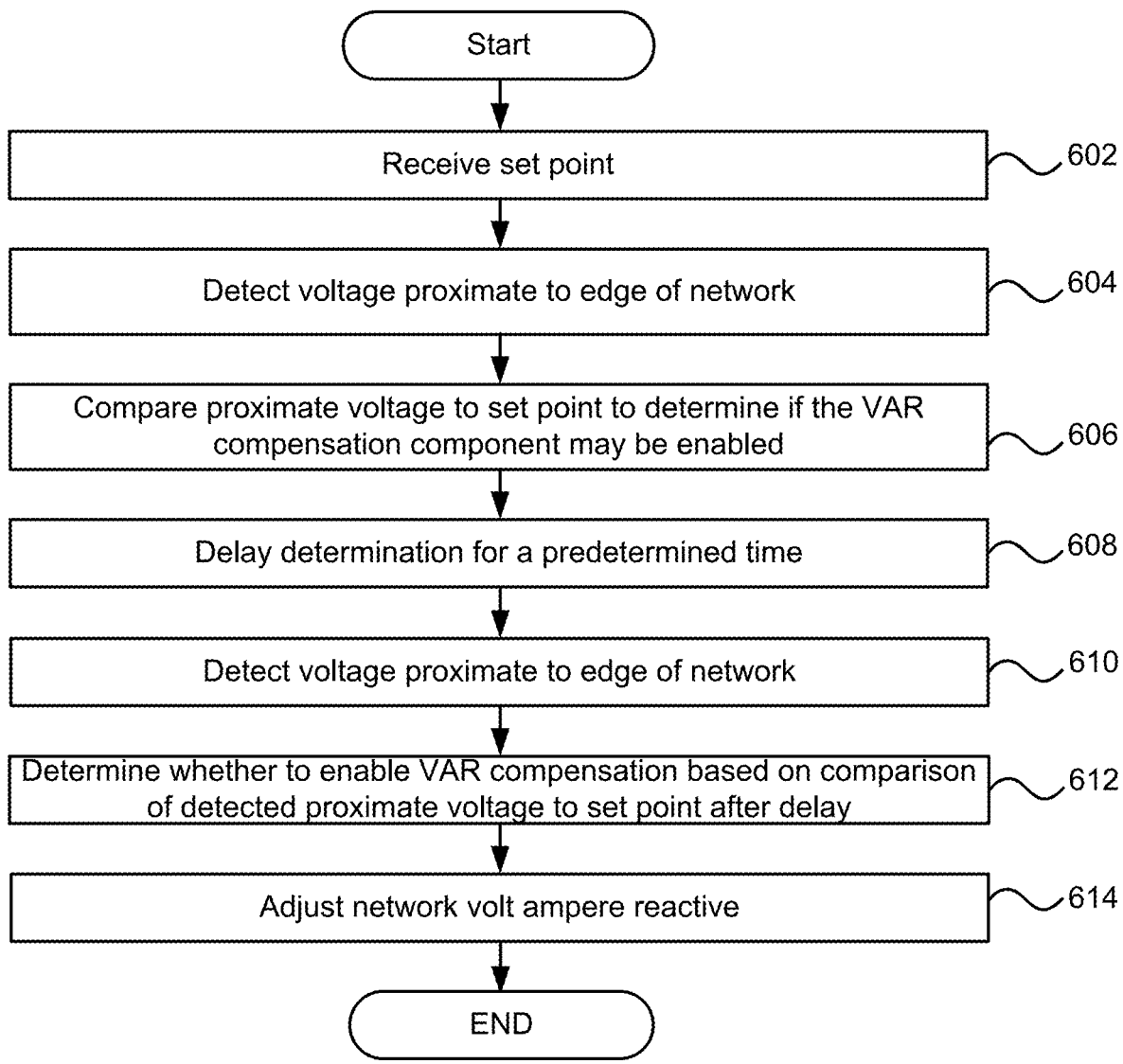
FIG. 6 is a flow chart for voltage regulation by a switch-controlled VAR source in some embodiments.

FIG. 6 is a flow chart for voltage regulation by a switch-controlled VAR source in some embodiments. In step 602, the switch-controlled VAR source may receive a first set point. In some embodiments, the switch-controlled VAR source comprises a communication module that may receive the set point from a digital device (e.g., wirelessly or through a communication module of a smart meter), from another shunt-connected, switch-controlled VAR source (e.g., through near field communication), power line carrier communication, or the like. The set point may activate the switch-controlled VAR source to enable VAR compensation or, in some embodiments, the set point may be a voltage set point which may be compared to a detected proximate voltage.

In some embodiments, the utility may include a VAR source server or other device configured to communicate with different VAR sources (e.g., via WiFi, cellular communication, near field communication, wired, or power line carrier). In various embodiments, the VAR source server may communicate with one or more other servers to communicate with the VAR sources. For example, the VAR source server may communicate through smart meters or servers that communicate with smart meters. One or more smart meter may comprise a VAR source or otherwise communicate with one or more VAR sources.

The first set point (e.g., a voltage set point) may be a part of a regulation profile. In one example, a plurality of regulation profiles may be received by the switch-controlled VAR source either during manufacture or through a communication module. Each regulation profile may comprise one or more different set points to improve power distribution and/or efficiency based on a variety of factors (e.g., time of day, history of usage, type of load, green energy production, and the like). In various embodiments, the processor of the switch-controlled VAR source may switch regulation profiles based on detected voltage, rate of change of voltage, communication with other switch-controlled VAR sources, communication with a VAR source server, temperature, time of day, changes to the grid or the like. Once implemented from the regulation profile, the processor of a switch-controlled VAR source will continue to detect proximate voltage and compare the voltage to the new set point(s) in order to determine whether a VAR compensation component should be enabled or disabled.

In step 604, the controller 426 (i.e., processor) detects proximate voltage at the edge of the network (e.g., near a load of the power grid). Proximate voltage is the voltage received from line 402 (e.g., the voltage at the point the line 402 is coupled to a feeder line or grid asset. The proximate voltage may be the voltage of where the shunt-connected, switch-controlled VAR source 400 is coupled in the power distribution grid at the time of voltage detection.

In some embodiments, the switch-controlled VAR source may detect voltage through another switch-controlled VAR source or a grid asset. In some embodiments, a smart meter, transformer, or other power device may detect voltage. The switch-controlled VAR source may receive the detected voltage from the other device or intercept the detected voltage at or during transmission.

In step 606, the controller 426 may compare the detected proximate voltage to any number of set points to determine if the VAR compensation component may be enabled or disabled. As discussed herein, the controller 426 may control a switch (e.g., relay and/or semiconductor switch) to enable or disable one or more capacitors and/or one or more inductors based on the comparison. Those skilled in the art will appreciate that the determination to enable or disable the VAR compensation component may be made by the processor of the switch-controlled VAR source as opposed to a centralized facility. The determination may be made autonomously and independent of other switch-controlled VAR sources.

Through the operation of any number of switch-controlled VAR sources operating to regulate voltage within the desired range, voltage regulation of the network may be achieved. Further, the voltage range may be flat and capable of dynamically responding to changes along one or more distribution lines and/or feeders.

In step 608, the controller 426 may delay switching the VAR compensation component for a predetermined time. As discussed herein, in order to avoid infighting between any number of switch-controlled VAR sources, one or more of the switch-controlled VAR sources may delay switching for a predetermined time. The time of delay may be different for different switch-controlled VAR source. For example, even if a first switch-controlled VAR source detects the need to regulate voltage, the first switch-controlled VAR source may wait until after a second switch-controlled VAR source has made a similar determination and enabled VAR compensation. The first switch-controlled VAR source may detect the change in the network and make another determination whether to further enable additional VAR compensation. As a result, multiple switch-controlled VAR source may not constantly correct and re-correct changes in network voltage caused by other switch-controlled VAR sources.

The delay time may be updated by the VAR source server, other switch-controlled VAR sources, or be a part of the regulation profile (e.g., which may comprise multiple different delay times depending on the need). In some embodiments, if detected voltage is changing at a substantial rate, the delay time may be accelerated. Those skilled in the art will appreciate that there may be many different ways to provide, update, and/or alter the delay time of a switch-controlled VAR source.

In step 610, after detecting and determining a need to change the network voltage and waiting the delay time, the switch-controlled VAR source may again detect any changes to the voltage and compare the change against one or more of the set points. If there remains a decision in step 612 that is consistent with the previous determination in step 606 (e.g., that the VAR compensation component should be enabled or disabled), then the switch-controlled VAR source may adjust the network voltage by engaging a switch to enable or disable the VAR compensation component.

In one example, if the proximate voltage is below a first set point, the controller 426 may control the relay 414 and the triac 420 to either form the connection to the line 402 or to confirm that the relay 414 is closed and/or the triac 420 is enabled. If the proximate voltage is above the second set point, the controller 426 may control the relay 414 and the triac 420 to either open the connection to the line 402 or to confirm that the relay 414 is open and/or the triac 420 is disabled.

In some embodiments, each of the plurality of shunt-connected, switch-controlled VAR sources may increase leading volt-ampere reactive if the set point is higher than the detected proximate voltage and decrease leading volt-ampere reactive if the set point is lower than the detected proximate voltage.

In some embodiments, the controller 426 may enable or disable an inductor based on the comparison of the detected proximate voltage to the set points. For example, based on the comparison, the controller 426 may disable the capacitor and enable an inductor (e.g., the controller 426 may control the relay 414 the triac 520 to create an open circuit to disable the capacitor while controlling another relay and another triac to enable the inductor to regulate voltage).

In various embodiments, voltage may be tracked over time. In some embodiments, the controller 426 may track the detected proximate voltage over time and provide the information to another switch-controlled VAR source and/or a digital device. For example, one switch-controlled VAR source may be in communication with any number of other switch-controlled VAR source (e.g., in a pole top enclosure). The one or more switch-controlled VAR sources may be a part of any grid asset such as a substation or transformer.

In some embodiments, the tracked detected voltage may be assessed and/or compared to a voltage history. The voltage history may be a history of past usage or may indicate an expected usage. In various embodiments, the controller 426 or a digital device may detect a failing grid asset based on the comparison. For example, the expected output and/or input of a grid asset may be determined and compared to the tracked detected proximate voltage. If the currently detected proximate voltage and/or tracked detected proximate voltage are not within the expected range, the tracked detected proximate voltage may be reviewed to determine if a grid asset has failed or is deteriorating. As a result, deteriorating equipment that may need to be replaced or receive maintenance may be identified and budgeted before performance significantly suffers thereby improving efficiency in both power delivery and upkeep of the distribution power grid.

Those skilled in the art will appreciate that potential theft may be identified. In various embodiments, each switch-controlled VAR source may detect and track voltage. The tracked voltage may be logged and/or provided to a VAR source server (e.g., via the communication module or antenna of another digital device such as a smart meter). The VAR source server may, for example, track voltage identified by all of the switch-controlled VAR sources along a feeder line and compare the voltage to consumption as tracked by the utility (e.g., via smart meters). Based on the comparison, theft may be detected. Further, based in part on the effect of any number of switch-controlled VAR sources, the theft may be localized for further investigation.

As suggested herein, massively distributed dynamically controllable VAR source strategy leverages other costs that a public utility is already bearing. For example, a switch-controlled VAR source may be located inside a smart meter or may be co-located with a smart meter so that the installation can proceed concurrently with meter installation or reading/servicing. These meters sense voltage and current to calculate the power consumption of the load, and have communications to relay the information to a central data repository. The cost of installing these is already built into the meter cost.

A simple communication mechanism with the meter may allow communication between the meter and the switch-controlled VAR source (e.g., for reporting to the utility on status, receiving set points, receiving delay times, and/or for taking commands to activate). In some embodiments, the load current measurement inside the smart meter may be communicated to the switch-controlled VAR source for use in the determination for voltage regulation.

In various embodiments, a meter switch-controlled VAR source may be very compact and ultra low-cost. In some embodiments, a typical rating may be 240 VARs at 240 volts, corresponding to 1 Ampere of capacitive current. This may be approximately the VAR drop across the leakage impedance of a 5% impedance transformer supplying 5 kW to a customer. Utility networks and asset loading calculations may be done on a statistical basis, assuming a load diversity factor. If all the meters (e.g., 10,000) on a distribution circuit have switch-controlled VAR sources, then there may be 2.5 MVARs of dynamically controllable VARs on that line, deployed on a per phase basis. Raising the compensation per switch-controlled VAR source to 500 VARs, for example, may only raise cost marginally, but may provide 5.0 MVARs of dynamic VAR compensation.

In various embodiments, the switch-controlled VAR source may be integrated into or be alongside any utility asset, such as a pole-mount transformer or lighting pole. As discussed herein, communication capability is not a requirement for switch-controlled VAR source operation, but may augment the ability to take dispatch instructions and to communicate status to the utility. A possible implementation would be to bundle multiple switch-controlled VAR sources into a common housing and locating the bundle within or proximate to a transformer supplying multiple residential or commercial loads. The bundle may be connected to the transformer on the low-voltage side thereby minimizing or reducing requirements for BIL management on the switch-controlled VAR sources.

Those skilled in the art will appreciate that the bundling may allow integration of a single communication module with multiple switch-controlled VAR sources, thereby allowing greater cost savings. This class of device may be measured in cost as a ratio of the dollars of cost of the actual device to the kiloVARs delivered ($/kVAR). This bundling may also allow the use of a single power supply and controller and provide reliable information on the switching behavior of the different switch-controlled VAR source.

In a bundled unit, it may be possible to minimize or reduce impact of harmonics on the grid. This implementation may maintain the basic features of the single user units; however, the bundle may provide more value to utility customers by integrating current and temperature measurement into the unit, using transformer loading and temperature excursions to calculate impact on transformer life, and/or communicating transformer status to the utilities. The bundled switch-controlled VAR source implementation, particularly when located in close proximity to pole-top or pad-mount transformers as conventionally used in the utility industry, may offer high value to the utility by performing dynamic volt-VAR optimization, and serving as an asset monitor for the millions of transformers located on the distribution network.

In various embodiments, in order to avoid multiple switch-controlled VAR sources from adjusting and readjusting the reactive power based on changes perceived by other switch-controlled VAR sources, one or more controllers may activate or deactivate different switch-controlled VAR source based on a different detected voltage.

The switch-controlled VAR source may perform reactive power compensation based on measured line voltage and not load or line current. As a result, the switch-controlled VAR source may not perform power factor correction. Power factor compensation may look at the line current and voltage to assess the level of correction required and may operate to bring customer load power factor to unity. Power factor correction may not manage reactive power for grid voltage regulation. Those skilled in the art will appreciate that power factor correction is often used to reduce penalties, and may reduce energy supplied by the utility to some extent (if loads have a significant lagging power factor). In other embodiments, the switch-controlled VAR source may detect current (e.g., via a meter, grid asset, or assessment by the controller 524) and perform power factor correction in addition to voltage regulation using a weighting algorithm.

Figure 7:
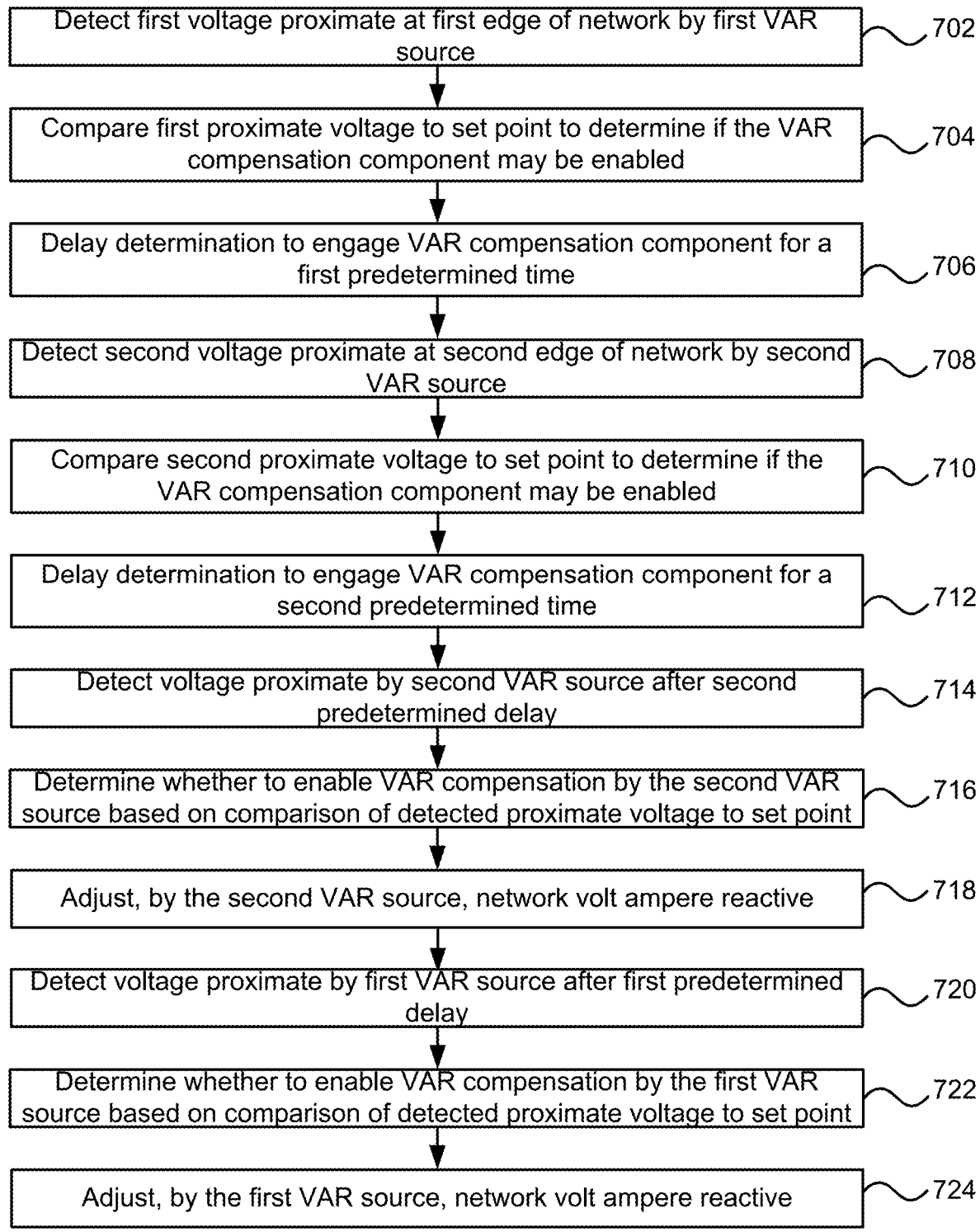
FIG. 7 is a time sequence of events of network regulation with two switch-controlled VAR sources in some embodiments.

FIG. 7 is a time sequence of events of network regulation with two switch-controlled VAR sources in some embodiments. In various embodiments, the first and second switch-controlled VAR sources may be proximate to each other (e.g., coupled to the same or related feeder line). Changes to voltage caused by one switch-controlled VAR source may be detected and reacted to by the other switch-controlled VAR source. As a result, to avoid infighting (e.g., constant correcting and re-correcting voltage in view of other switch-controlled VAR source actions), the switching process for one or more of the switch-controlled VAR sources may be delayed by a different delay time. As a result, even if the first switch-controlled VAR source originally determined to enable the VAR compensation component based on the detected voltage, the first switch-controlled VAR source may wait the delay time thereby giving the second switch-controlled VAR source an opportunity to correct voltage. If the action of the second switch-controlled VAR source was sufficient, then the first switch-controlled VAR source may detect the change and not perform any switching action.

In step 702, the first switch-controlled VAR source detects a first voltage proximate to a first edge of the network. In some embodiments, the first switch-controlled VAR source detects a voltage at a particular load on the low power side of a transformer. In step 704, the first switch-controlled VAR source may compare the first proximate voltage to a set point to determine if the VAR compensation component of the first switch-controlled VAR source should be enabled. In step 706, the switch-controlled VAR source may delay switching to engage the VAR compensation component for a first predetermined time (i.e., for a first delay).

In step 708, the second switch-controlled VAR source detects a second voltage proximate to a second edge of the network. In some embodiments, the second switch-controlled VAR source detects a voltage at a particular load on the low power side of a transformer. In one example, both the first and second switch-controlled VAR source may be coupled to the same feeder line and/or on the same side of the same transformer. In step 710, the second switch-controlled VAR source may compare the second proximate voltage to a set point to determine if the VAR compensation component of the second switch-controlled VAR source should be enabled. In step 712, the switch-controlled VAR source may delay switching to engage the VAR compensation component for a second predetermined time (i.e., for a second delay).

The first and second delay may be for different periods of time. As a result, each switch-controlled VAR source may delay acting on the comparison of the detected proximate voltage to one or more set points until other switch-controlled VAR sources have had an opportunity to correct voltage of the network. If, after the predetermined time, the initial determination is still necessary (e.g., the proximate voltage has remained unchanged or still outside of the set point(s) after expiration of the delay time), then a switch-controlled VAR source may control a switch to engage or disengage the VAR compensation component.

In various embodiments, delays may be used to avoid infighting between two or more switch-controlled VAR sources. The delays may be updated and/or communicated by another digital device (e.g., wirelessly, over power line carrier, or via a smart meter).

As discussed herein, the delay time may be altered based on conditions of the power network. For example, if the rate of change of voltage, current, or any power characteristic is significant, the delay time may be shortened or extended. In some embodiments, there are different delay times for different switch-controlled VAR sources, however, all of the delay times may be changed in the similar manner (e.g., shortened or extended) under similar conditions.

In step 714, the second switch-controlled VAR source detects proximate voltage after the second delay time (e.g., after the second predetermined delay). In various embodiments, the switch-controlled VAR sources detect proximate voltage at predetermined times or continuously. Once the delay is expired, the controller of the second switch-controlled VAR source may retrieve the last detected voltage or detect voltage of the line. In step 716, the second switch-controlled VAR source determines whether to enable VAR compensation based on comparison of the last detected proximate voltage to one or more set points.

In step 718, if, based on the comparison, the second switch-controlled VAR source determines to enable the VAR compensation component, the second switch-controlled VAR source may adjust the network voltage (e.g., by regulating VAR).

In various embodiments, the first switch-controlled VAR source may continue the delay before switching the related VAR compensation component. The first switch-controlled VAR source may detect a change in voltage caused by the action of the second switch-controlled VAR source. If, after the first delay, the newly detected proximate voltage is still outside a range established by one or more set points, the first switch-controlled VAR source may engage the VAR compensation component. If, however, after the delay, the action of the second switch-controlled VAR source improves network voltage (e.g., the newly detected voltage is within a range of the one or more set points), the first switch-controlled VAR source may not take further action.

In step 720, the first switch-controlled VAR source detects proximate voltage after the first delay time (e.g., after the first predetermined delay). In one example, once the delay is expired, the controller of the first switch-controlled VAR source may retrieve the last detected voltage or detect voltage of the line. In step 722, the first switch-controlled VAR source determines whether to enable VAR compensation based on comparison of the last detected proximate voltage to one or more set points.

In step 724, if, based on the comparison, the first switch-controlled VAR source determines to enable the VAR compensation component, the first switch-controlled VAR source may adjust the network voltage (e.g., by regulating VAR).

Those skilled in the art will appreciate that the voltage set points may be preconfigured. In some embodiments, one or both switch-controlled VAR sources may comprise communication module(s) configured to receive set point(s). In one example, a switch-controlled VAR source may receive new set points that may replace or supplement previously received and/or pre-existing set points.

Although only two switch-controlled VAR sources are discussed regarding FIG. 7, those skilled in the art will appreciate that there may be any number of switch-controlled VAR sources working to adjust the network volt ampere reactive (e.g., each may have different delays to prevent infighting).

Figure 8:
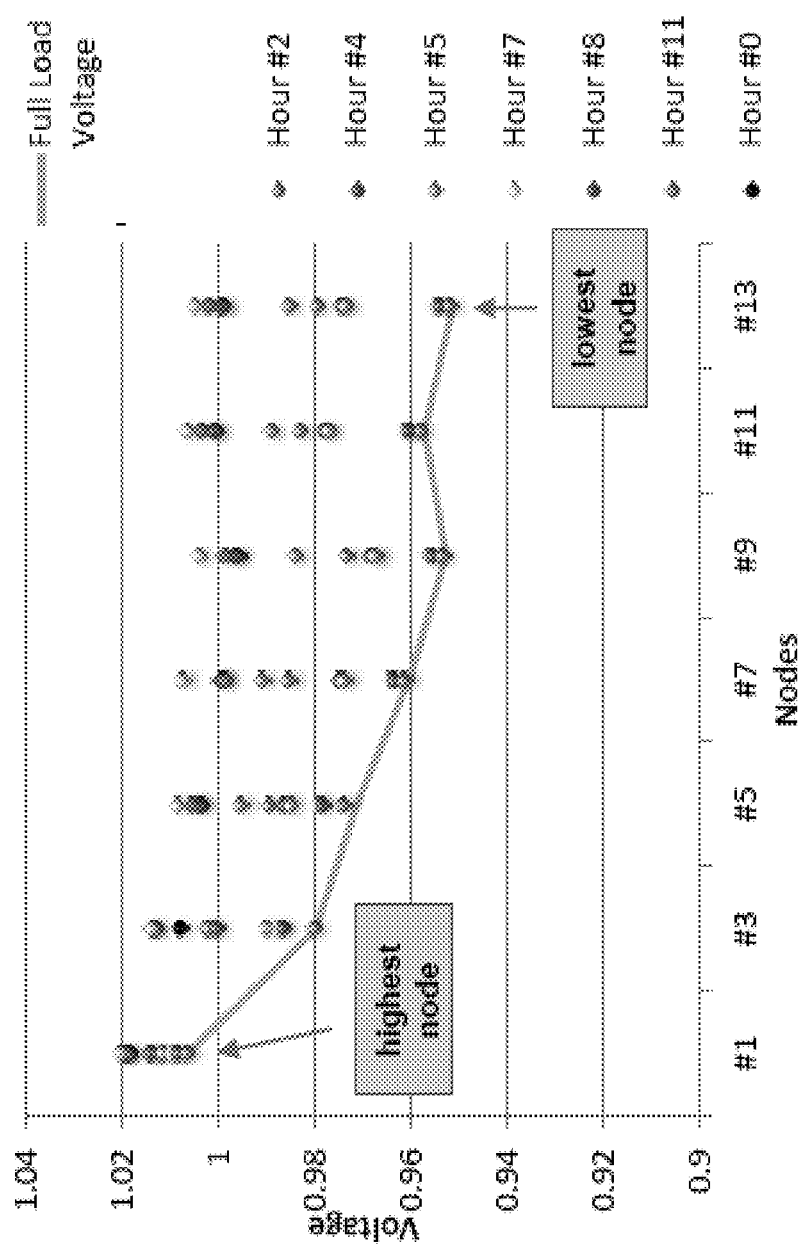
FIG. 8 is a graph that depicts a typical voltage profile at various nodes in the prior art.

FIG. 8 is a graph that depicts a typical voltage profile at various nodes in the prior art. Colored dots represent various times of the day. With the prior art's approaches, a VVO or CVR solution is limited by the highest and lowest voltage nodes.

Figure 9:
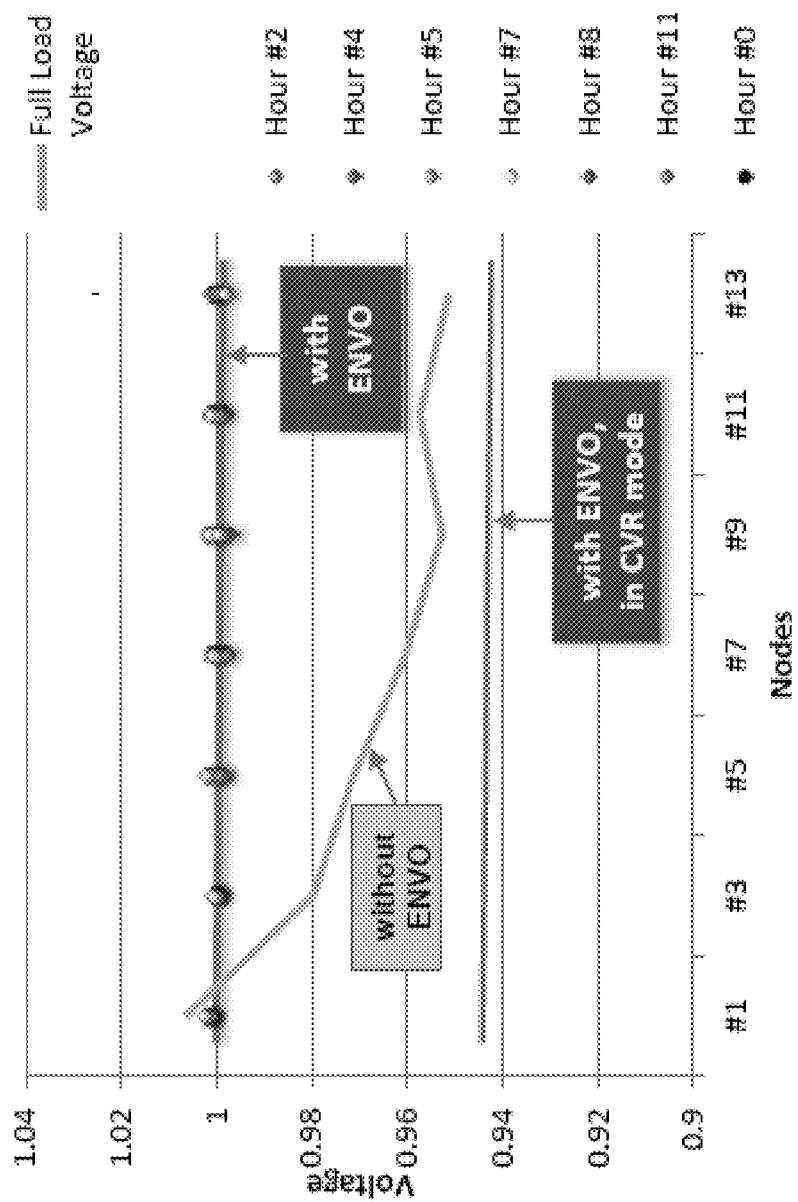
FIG. 9 is a graph that depicts relatively flat voltage profile at various nodes in some embodiments realized with 240 switch controlled VAR sources operating to regulate the voltage along the edge of the distribution feeder.

FIG. 9 is a graph that depicts relatively flat voltage profile at various nodes in some embodiments realized with 240 switch controlled VAR sources operating to regulate the voltage along the edge of the distribution feeder. Edge of Network Voltage Optimization (ENVO) as discussed herein may be achieved through dynamic, autonomous actions of multiple switch-controlled, VAR sources at or near the edge of the network. The switch-controlled, VAR sources may react automatically and autonomously (e.g., independent switching to enable or disable a VAR compensation component) to varying levels of loading on the feeder, maintaining the edge of network voltage all along the feeder within a tight regulation band.

This regulation may be maintained automatically even as heavily loaded regions shift randomly and stochastically over the design range for the feeder. In some embodiments, what results is a remarkably flat voltage profile across all measured edge of network points which is unprecedented under current technology. The graph shows voltage with ENVO that is relatively flat, voltage without ENVO that drops significantly, and a relatively flat voltage utilizing ENVO in CVR mode. The voltage spread is seen to reduce from +1-5% without compensation to +1-1% with ENVO when operated with the same feeder and the same load.

Figure 10:
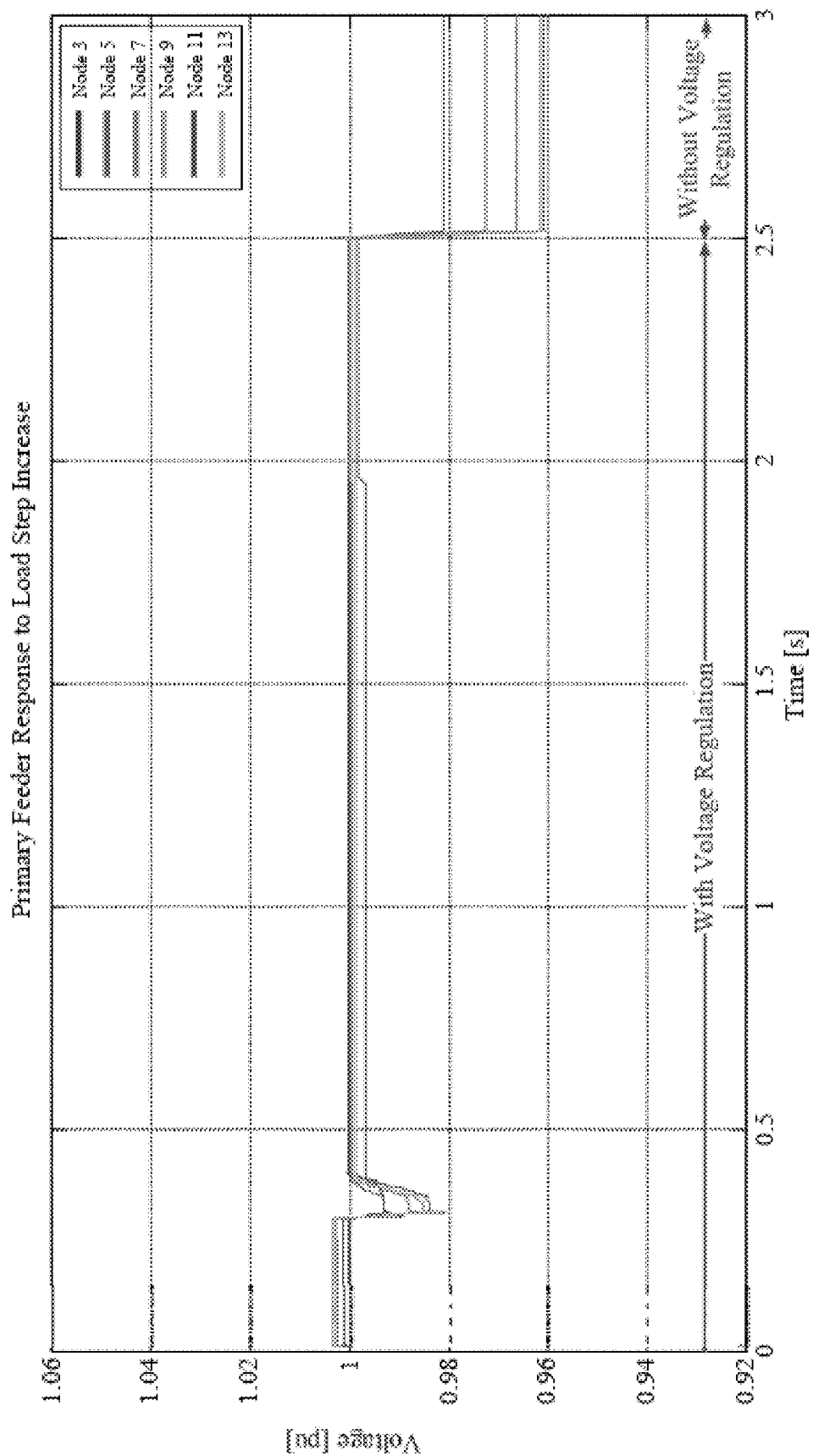
FIG. 10 is a graph that depicts a dynamic response of the ENVO system to line voltage changes (which can be caused by solar PV plants), as well as to step changes in line loading in some embodiments.

FIG. 10 is a graph that depicts a dynamic response of the ENVO system to line voltage changes (which can be caused by solar PV plants), as well as to step changes in line loading in some embodiments. In both cases, the voltage across the entire line is seen to quickly stabilize, demonstrating the high speed response. It may be noted that the initial changes to the lines beginning at time 0 and the changes to the lines after time 2.5 are a part of the set up and deactivation of a simulation.

FIG. 10 shows the ability to implement CVR with ENVO compensation, realizing a flat and reduced voltage profile along the length of the feeder. Coordinating with an LTC at the substation, it is seen that the edge of network voltage may be reduced by 3-6% (e.g., 4%) giving a reduction of 3.2% of energy consumed under a typical CVR factor of 0.8. This level of performance is simply not possible with conventional VVC or VVO solutions in the prior art.

The ENVO system operation may not be generally impacted by network configuration or by direction of power flows (e.g., from sporadic green energy generation), as are other VVO methods that rely on concentrated positions of devices that may work for one configuration but not another. As a result, network reconfiguration due to Fault Detection Isolation and Restoration (FDIR) schemes may not negatively impact the ENVO. Further, operation of tap changers may be simplified, as can the implementation of CVR functionality due to the increased control of the edge of network voltage profile. Moreover, the ENVO system sources may respond rapidly (e.g., within or much less than a cycle such as equal or less than 16.6 ms), to system faults helping to avert cascading failures such as Fault Induced Delayed Voltage Recovery or FIDVR events.

While no communication is required to achieve a flatter voltage profile along the entire length of the line, in various embodiments, inexpensive slow-speed variable-latency communications may allow advanced functions such as VVO and CVR (e.g., through set points), without the complexity of current VVO systems, at a cost that is substantially lower. Further, significant opportunities may exist to leverage existing investments in communications and other grid infrastructure to further reduce the total cost of ownership.

In mature markets, such as in the US, the ENVO system may implement a cost-effective distribution automation technology with a strong return on investment (ROI). In some embodiments, the ability to dynamically and/or automatically compensate for line-voltage drops all along the feeder allows building longer feeders, allows an increase in the capacity of existing feeders, particularly in rural areas, and significantly reduces the number of tap changing regulators needed as well as reduces the frequency of tap changes. It may also allow easier integration of distributed generation resources and may counteract the rapid voltage fluctuations caused by green energy generation (e.g., unpredictable clouds or wind change).

Figure 11A:
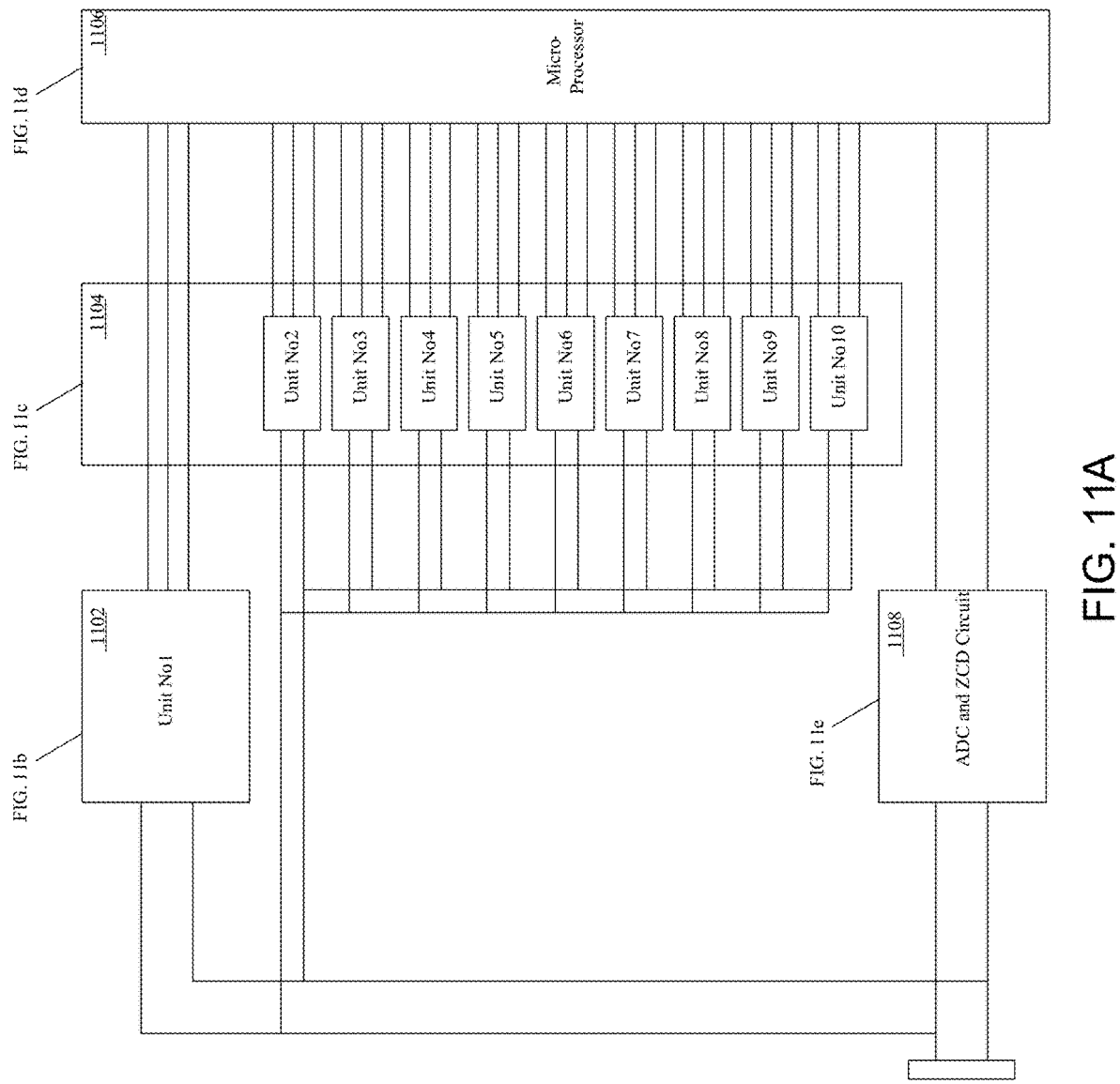
FIG. 11A is another circuit diagram of a plurality of switch-controlled VAR sources that may be within or next to a pole top transformer or any grid asset in some embodiments.

FIG. 11A is another circuit diagram of a plurality of switch-controlled VAR sources that may be within or next to a pole top transformer or any grid asset in some embodiments. FIGS. 1b-3 focus on different portions of the circuit diagram of FIG. 11A. In various embodiments, any transformer (e.g., pole top transformer), smart meter, meter, or grid asset may comprise one or more VAR sources. Each of a plurality of VAR sources may make determinations and adjust voltage autonomously from others in the pole top transformer. In some embodiments, a plurality of VAR sources may share any number of components, including, for example, a controller and/or a power supply unit.

In various embodiments, one or more controllers may control two or more of the VAR sources in a pole top transformer to coordinate voltage adjustment. For example, a single controller may detect proximate voltage, compare the voltage against one or more set points, determine a voltage adjustment, and determine which of the VAR sources should be enabled (or disabled) to achieve the desired effect and provide the appropriate commands.

In some embodiments, one or a subset of the VAR sources may comprise one or more inductors in parallel with one or more capacitors. Those skilled in the art will appreciate that the inductor may be enabled when necessary to adjust voltage. In other embodiments, there may any number of inductors and any number of capacitors in any number of the shunt-connected, switch-controlled VAR sources.

FIG. 11A depicts a switch-controlled VAR source 1102, a plurality of switch-controlled VAR sources 1104, a controller 1106, and a power module 1108. The switch-controlled VAR source 1102 may be any one of the plurality of switch-controlled VAR sources 1104. The switch-controlled VAR source 1102 may be similar to the switch-controlled VAR source 400. The plurality of switch-controlled VAR sources 1104 may comprise any number of switch-controlled VAR sources. The controller 1106 may be a microprocessor, PIC, or any processor. The power module 1108 may perform voltage detection and/or zero crossing threshold detection (ZCD).

Those skilled in the art will appreciate that the circuits depicted in FIG. 11A may be a part of any device or combination of devices and is not limited to pole top transformers. For example, there may be a plurality of switch-controlled VAR sources 1104, controllers 1106, and/or power modules 1108 associated with any grid asset or as a standalone unit (e.g., coupled to a feeder line in shunt).

Figure 11B:
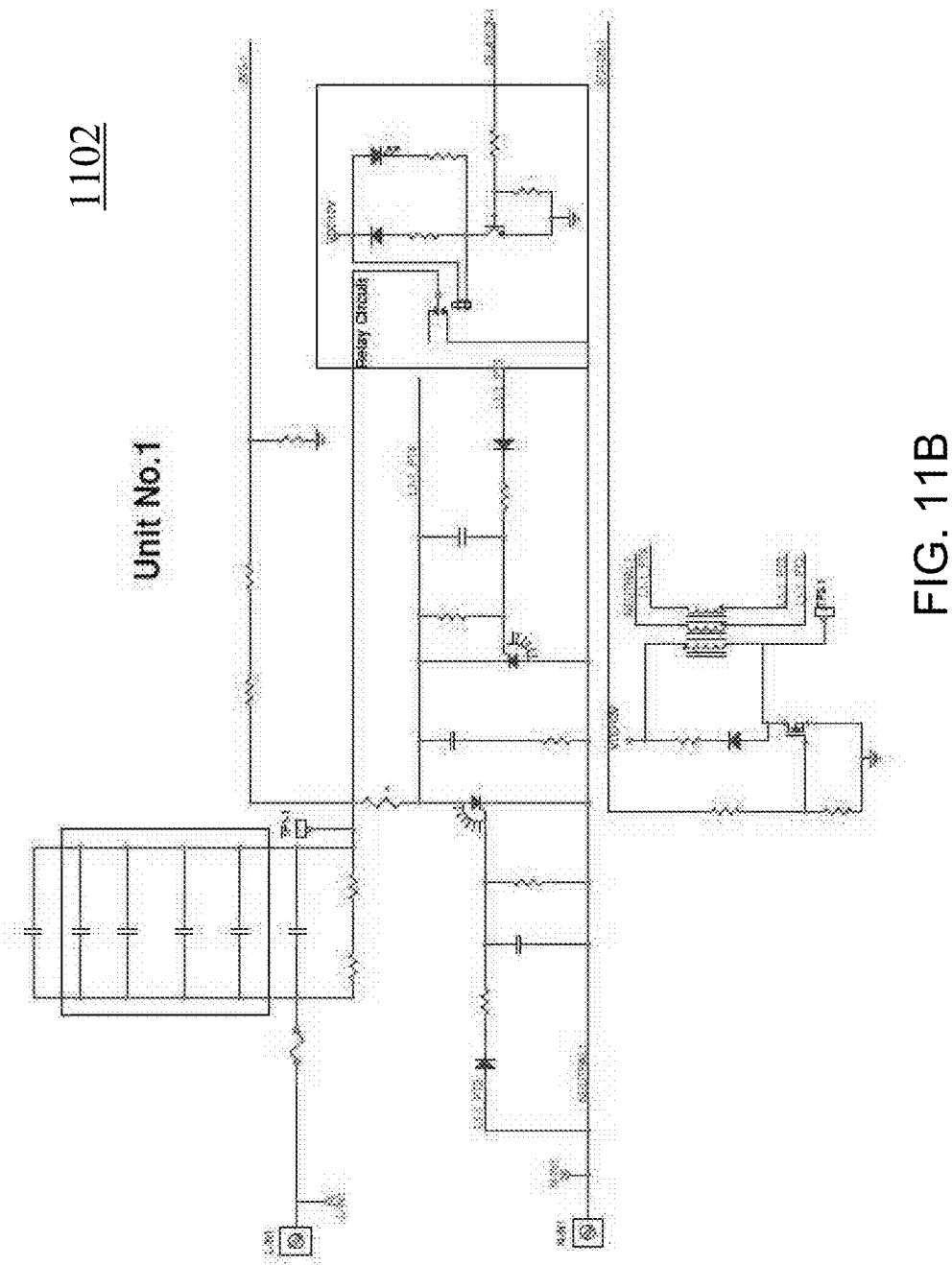
FIG. 11B depicts a switch-controlled VAR source in some embodiments.

FIG. 11B depicts a switch-controlled VAR source 1102 in some embodiments. The switch-controlled VAR source 1102 may comprise a fuse, capacitor, harmonic sensor, zero voltage detection for ADC circuitry, I sense detection for ADC circuitry, and a relay circuit. The switch-controlled VAR source 1102 may be coupled to a feeder in shunt, adjust reactive power, and provide information (e.g., harmonic information, ZVD, and/or I sense signals) to the controller 1106. The triac and relay circuit may be controlled by signals from the controller 1106.

In some embodiments, the harmonic sensor may detect harmonic resonance which may be subsequently reduced or eliminated. The I sense detection for ADC circuitry and zero voltage detection for ADC circuitry may be used to detect current, harmonics, and/or voltage which may allow the controller 1106 to better protect the circuit and make adjustments for voltage regulation. The relay circuitry may be a part of the switch to enable or disable the capacitor.

Figure 11C:
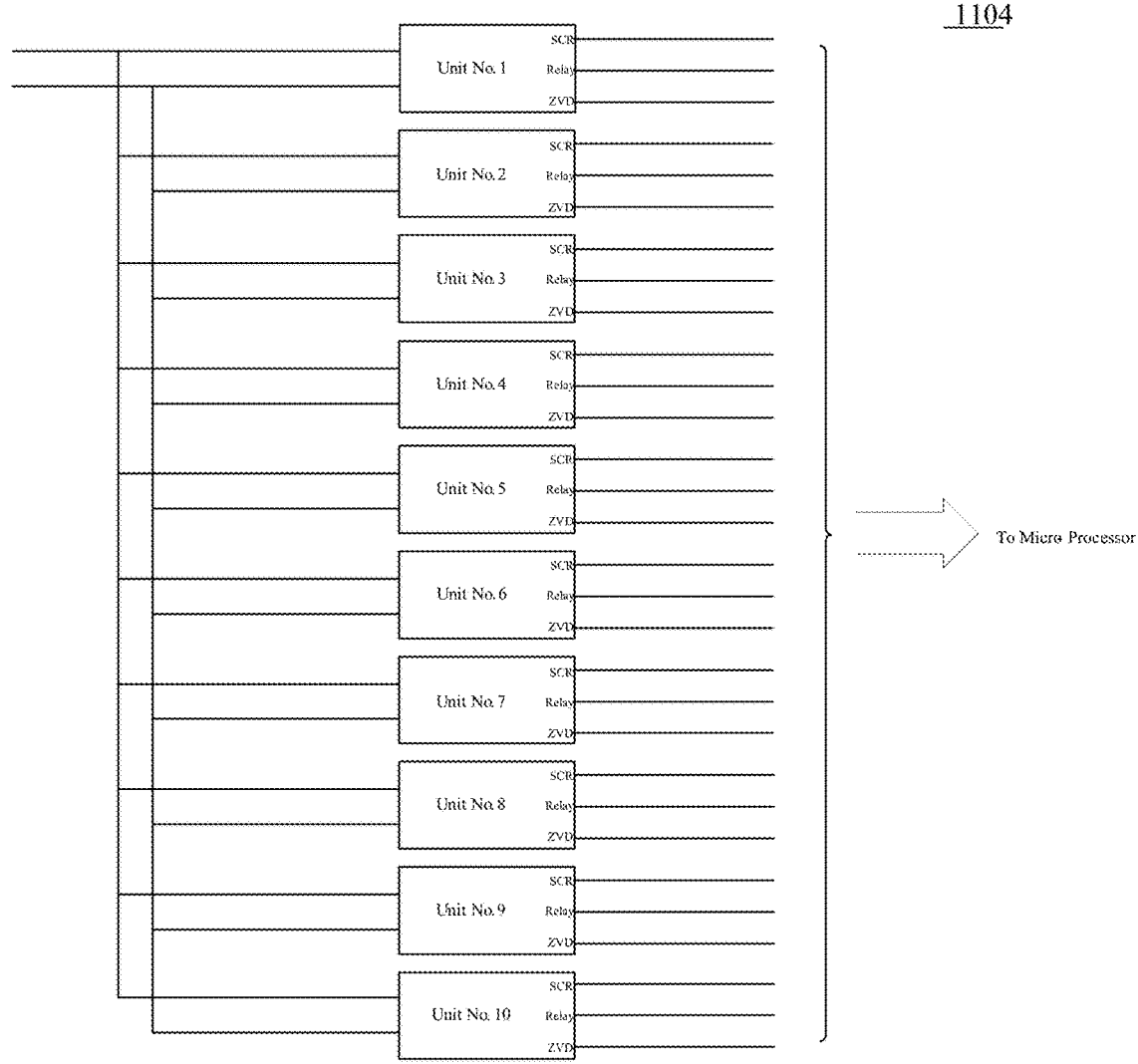
FIG. 11C depicts a plurality of switch-controlled VAR sources in some embodiments.

FIG. 11C depicts a plurality of switch-controlled VAR sources 1104 in some embodiments. Each switch-controlled VAR source of FIG. 11C may include similar or dissimilar components from the other switch-controlled VAR sources. For example, one or more of the switch-controlled VAR sources may comprise an inductor in parallel with a capacitor. A single controller may control one or more of the switch-controlled VAR sources.

Figure 11D:
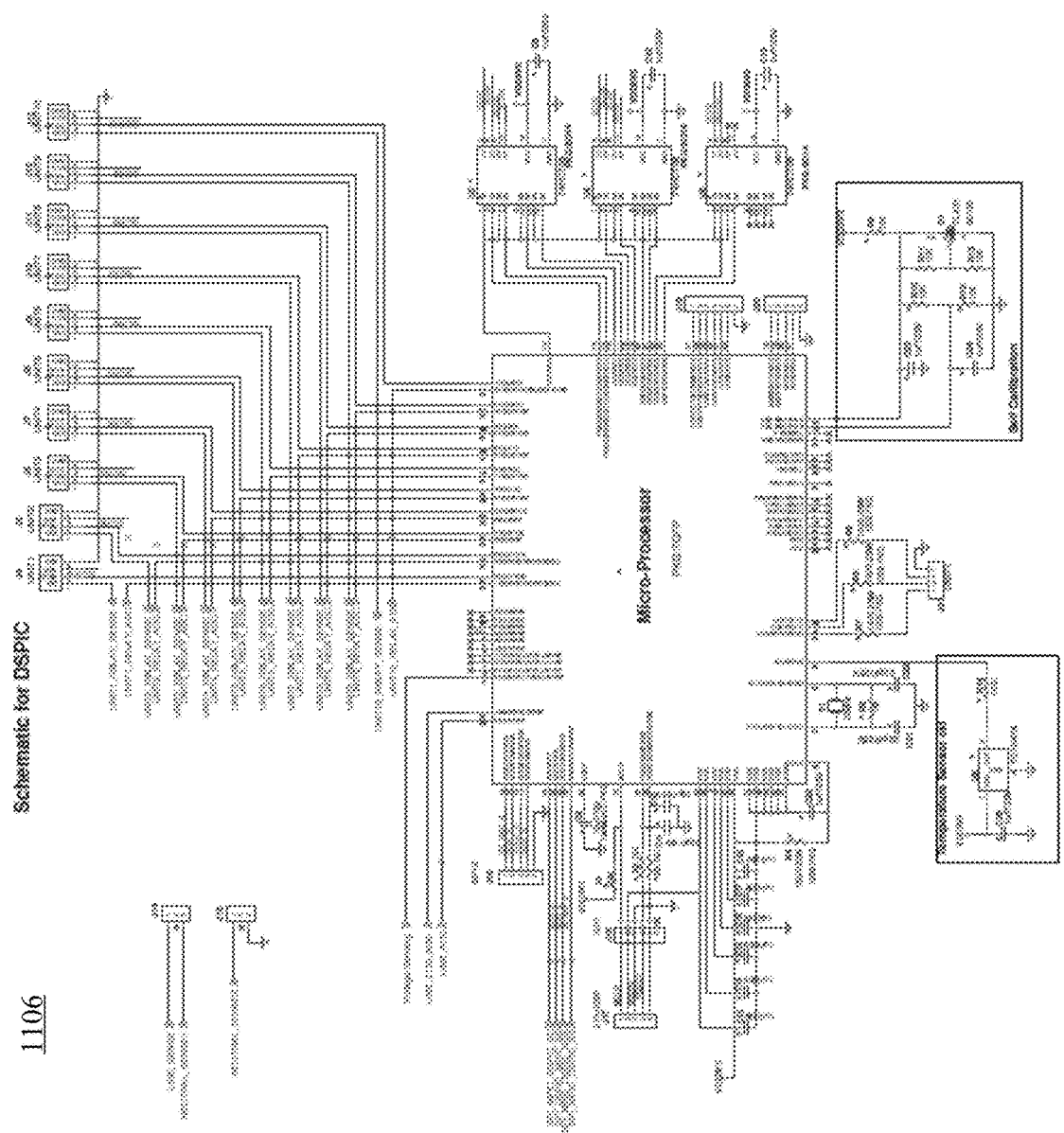
FIGS. 11D and 11D-1 through 11D-4 depict a controller in some embodiments.
Figures 1, 11D:
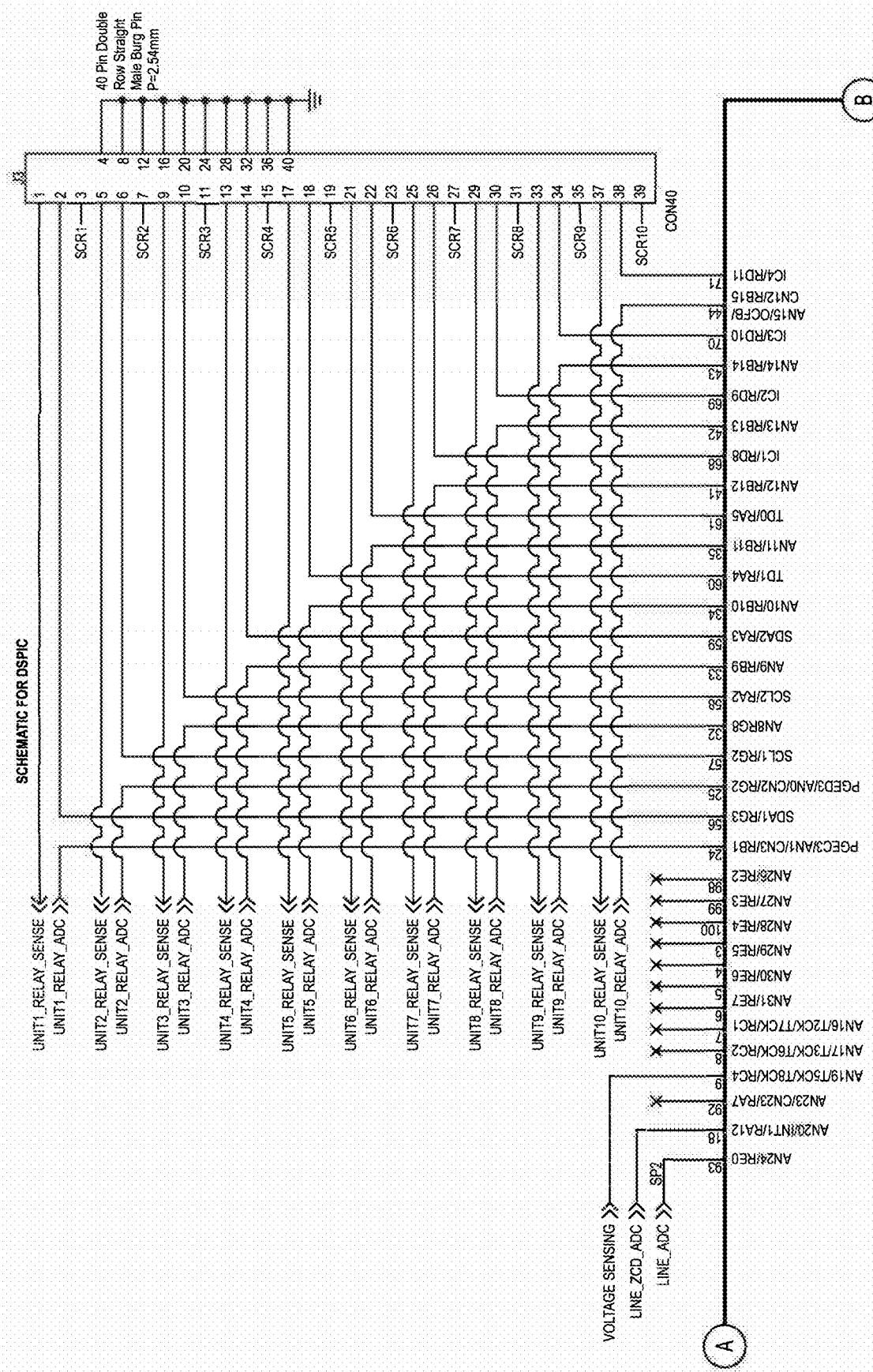
Figures 2, 11D:
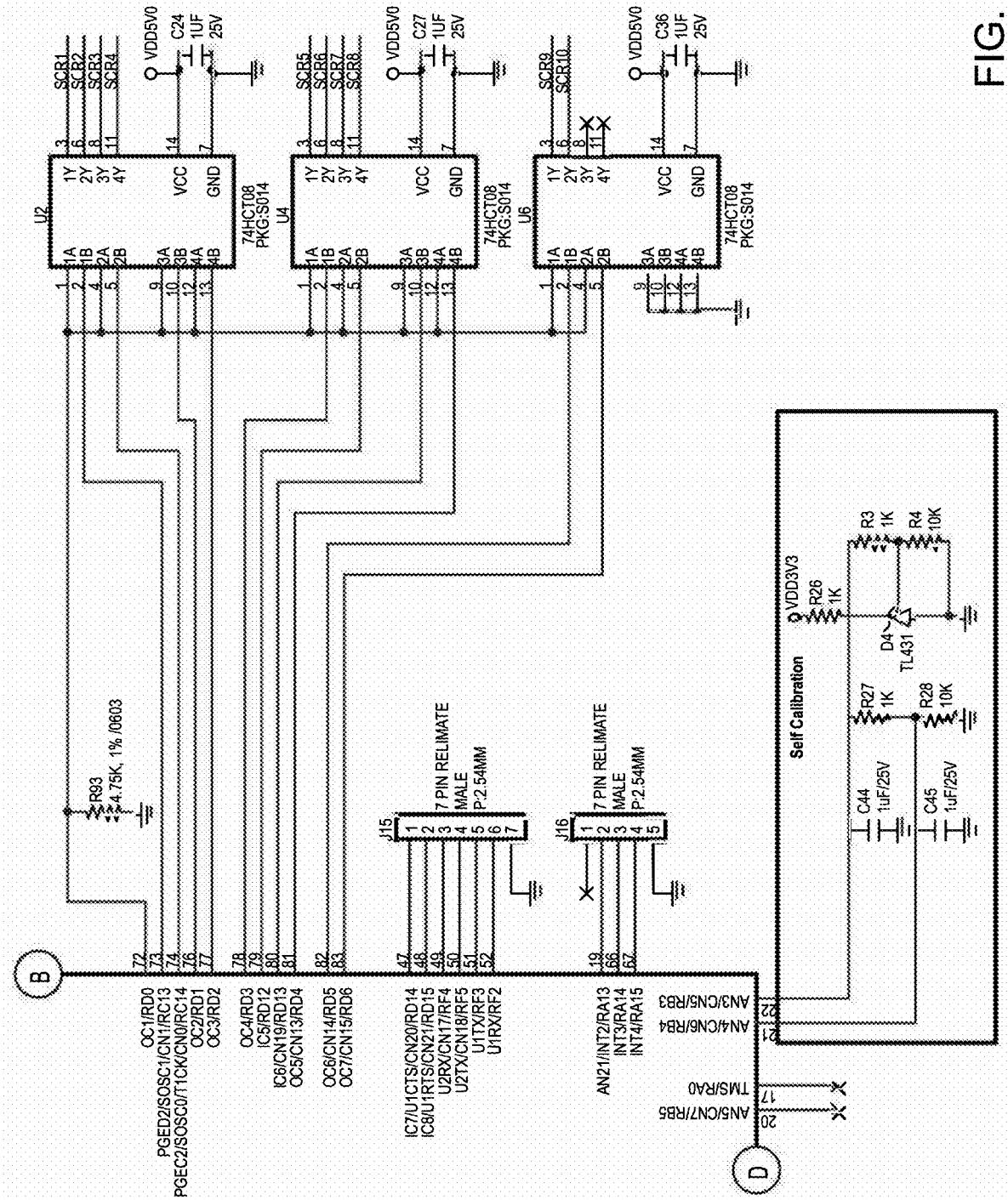
Figures 3, 11D:
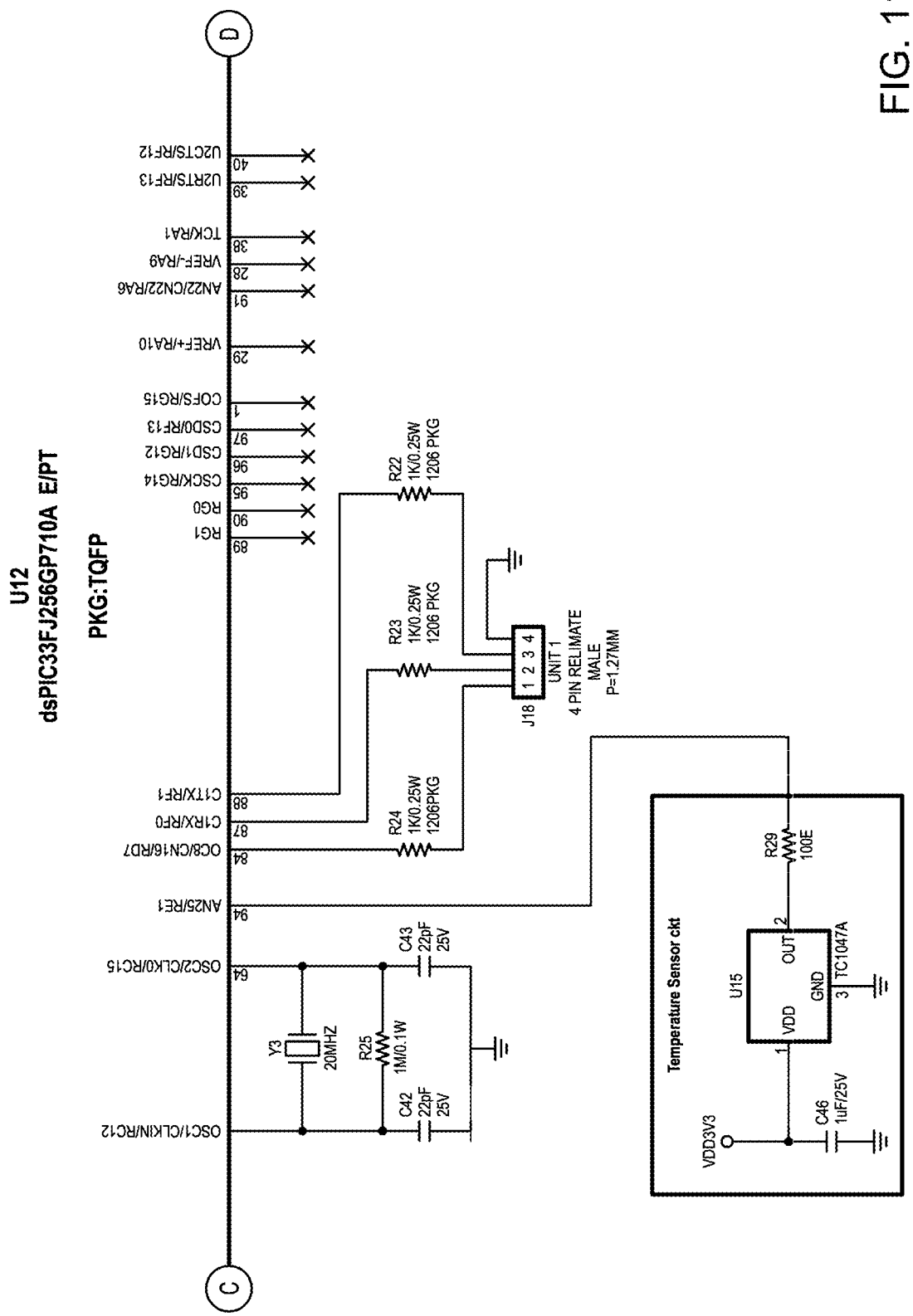
Figures 4, 11D:
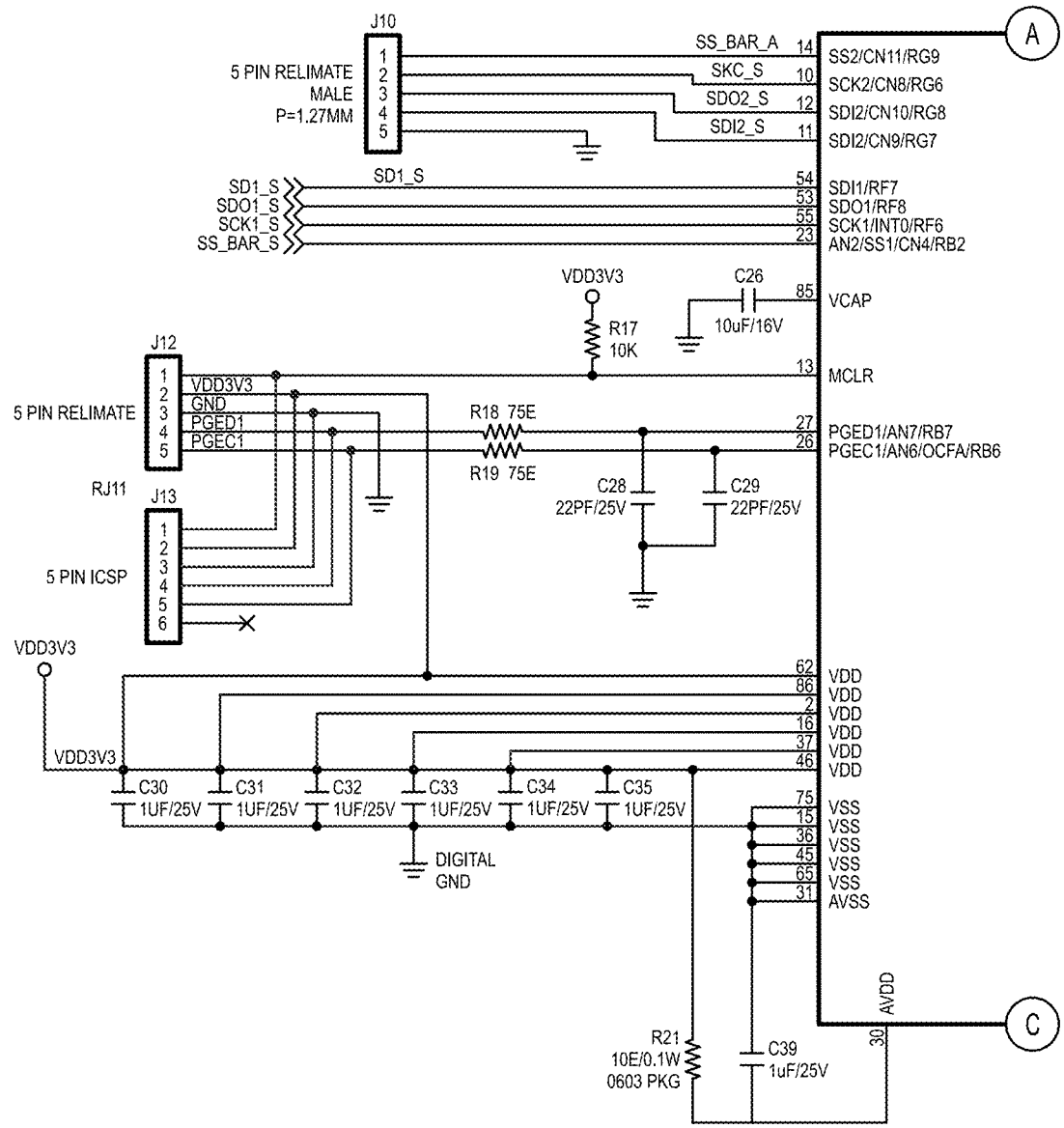

FIGS. 11D and 11D-1 through 11D-4 depict a controller in some embodiments. The controller 1106 may control any number of switch-controlled VAR sources 1104. The controller may receive information (harmonic information, ZVD, and/or I sense signals) from one or more of the switch-controlled VAR sources and use the information to control triacs, relays, and/or reduce harmonic resonance. For example, the controller 1106 may receive and make adjustments based on voltage detection of only one of the plurality of switch-controlled VAR sources 1104. Although only one processor is depicted in FIGS. 11A and 11D, those skilled in the art will appreciate that there may be any number of processors coupled to any number of switch-controlled VAR sources.

Figure 11E:
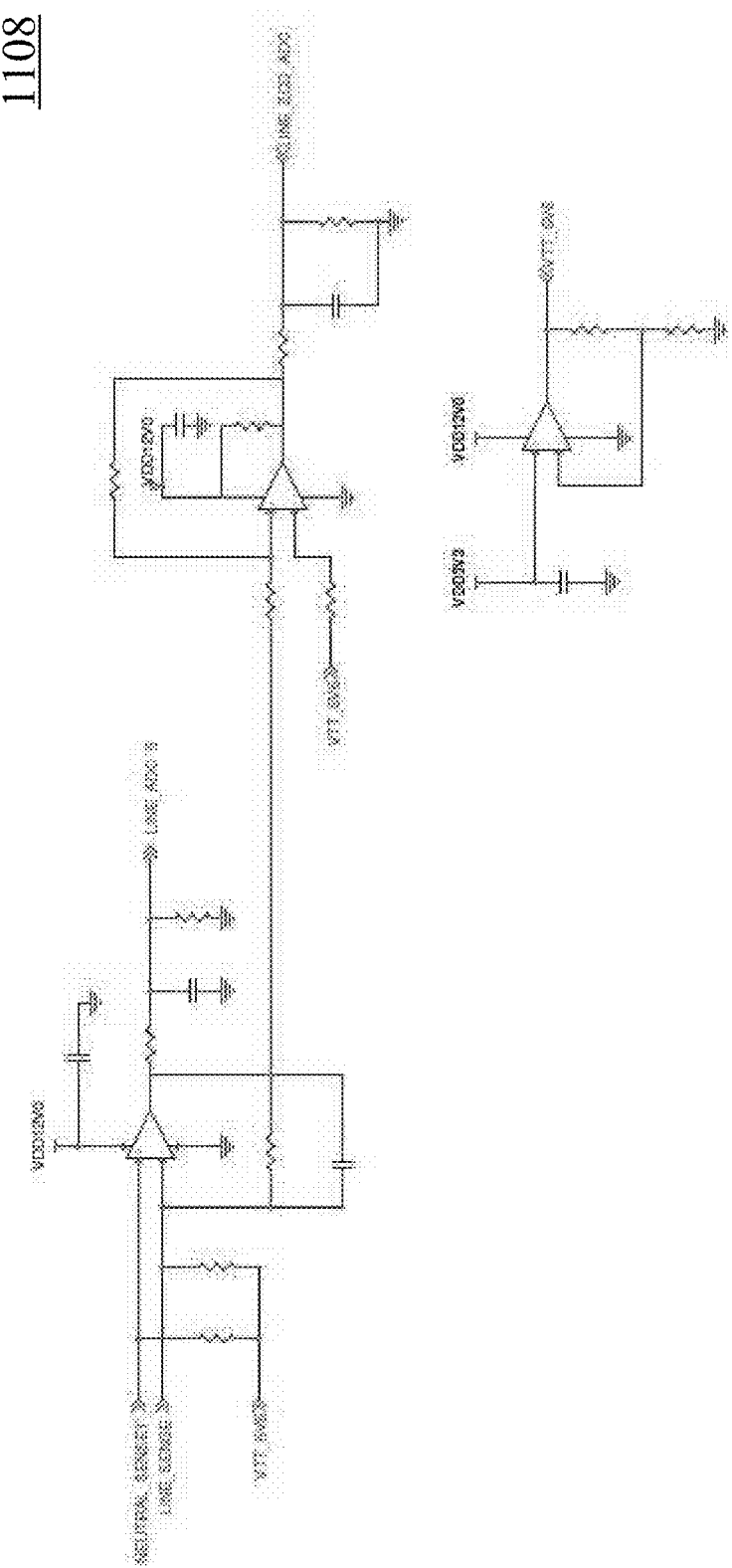
FIG. 11E depicts power module comprising ADC circuitry and ZCD circuitry coupled to the controller in some embodiments.

FIG. 11E depicts power module 1108 comprising ADC circuitry and ZCD circuitry coupled to the controller 1106 in some embodiments. The ADC circuitry and ZCD circuitry may be coupled to the feeder and provide information and/or power to the controller 1106. The ADC circuitry and ZCD circuitry may provide the controller 1106 power and/or information regarding voltage. In some embodiments, the controller 1106 controls one or more of the triacs of the plurality of the switch-controlled VAR sources 1102 based on the zero crossing detection.

Those skilled in the art will appreciate that other circuit designs, components, and the like may perform similar functionality or perform similar results and still be within the invention(s) described herein.

In some embodiments, a Distributed Controllable VAR Source (DCVS) that integrates a VAR source with various customer-located assets (e.g., Smart Meters, electric vehicle chargers, demand response controllers, smart thermostats) is provided. As such, a cloud of distributed VAR sources may be implemented.

Figure 12:
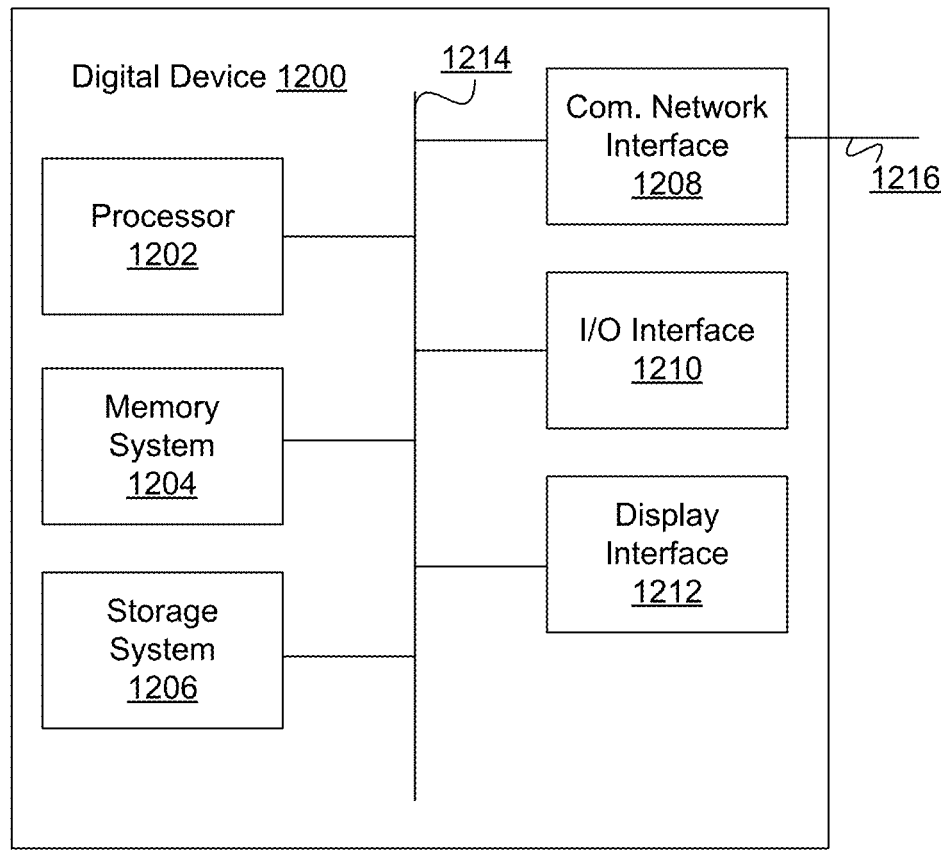
FIG. 12 illustrates an exemplary power system including a VAR cloud in some embodiments.

FIG. 12 illustrates an exemplary power system 1200 including a VAR cloud 1202 in some embodiments. In the illustrated example, the power system 1200 comprises a primary distribution network 1201, a VAR cloud 1202, a Supervisory Control and Data Acquisition (SCADA) 1203, and a data concentrator 1204. The VAR cloud 1202 includes a cloud of DCVS 1-n 1205-1214. The distribution network 1201 includes various power system assets such as a capacitor bank, a Load Tap Changer (LTC), a Line Voltage Regulator (LVR), or other devices. The DCVS may work at different locations including residential locations, commercial and/or industrial locations, and/or service transformers. For example, the DCVS's 1205-1209 and 1212 are at residential locations, the DCVS 1213 is at commercial and/or industrial locations, the DCVS's 1207, 1210, and 1214 are at service transformer locations, and the DCVS 1211 is integrated with customer assets 1215 that may be at various locations. As illustrated, a large quantity (e.g., from 100,000 to several million) of DCVS's may be deployed per utility customer. Infrastructures that support the operation of a power grid may be leveraged to gather data from and to manage the distributed VAR cloud and thereby provide new value streams to utility customers. For example, the data concentrator 1204, a meter data management system, data historian, or other similar systems or grid components may integrate the data flows and realize significant cost savings.

Figure 13:
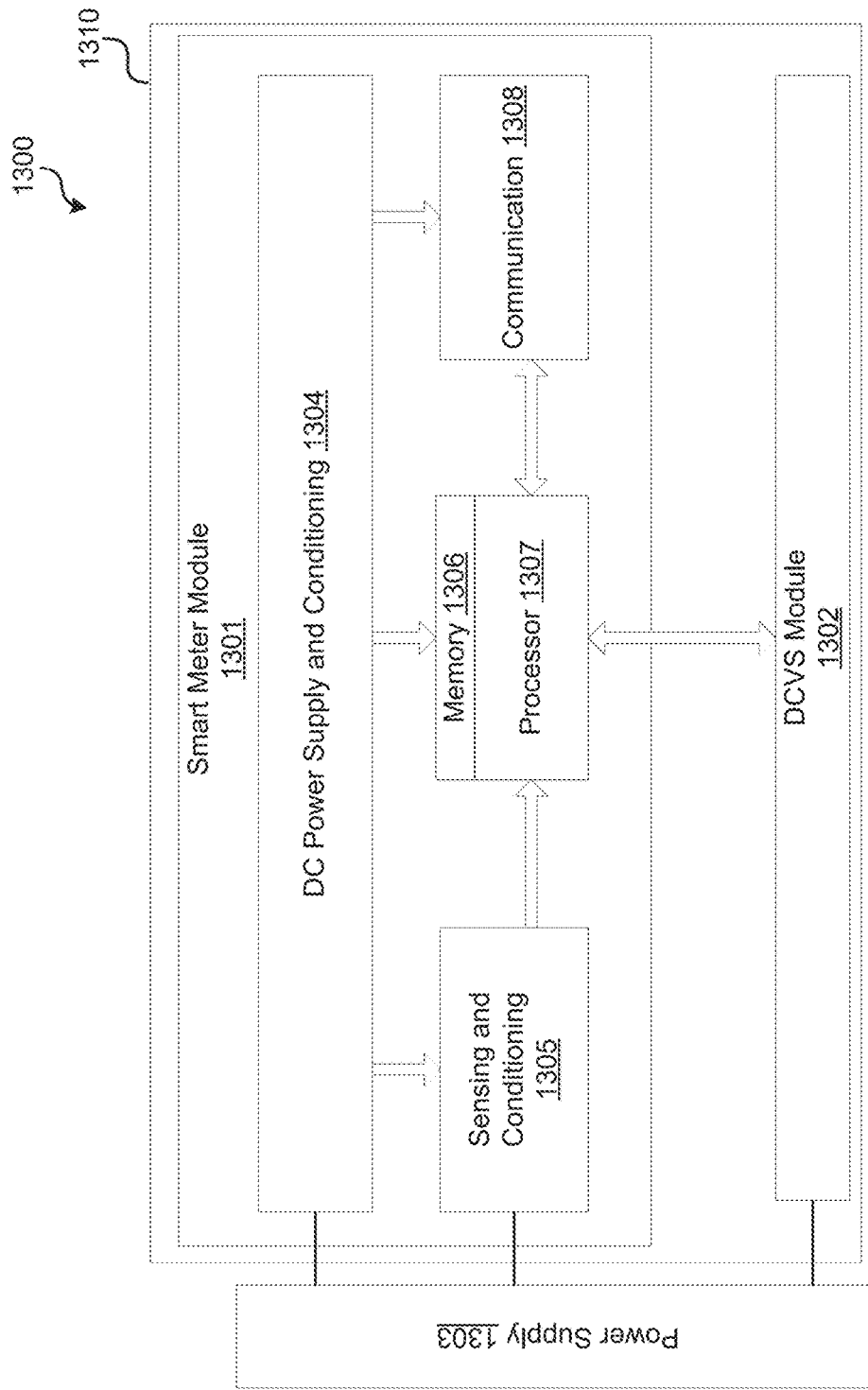
FIG. 13 is a block diagram of an exemplary distributed controllable VAR source (DCVS) in some embodiments.

FIG. 13 is a block diagram of an exemplary distributed controllable VAR source (DCVS) 1300 in some embodiments. The illustrated DCVS 1300 integrates a smart meter module 1301 and a DCVS module 1302. The smart meter module 1301 comprises a DC power supply and conditioning sub-module 1304, a sensing and signal conditioning sub-module 1305, a memory sub-module 1306, a processor sub-module 1307, and a communication sub-module 1308. The DC power supply and conditioning sub-module 1304 is configured to provide power to various sub-modules included in the smart meter module 1301. The sensing and conditioning sub-module 1305 is configured to measure voltage across and/or current through the smart meter module 1301. The sensing and conditioning sub-module 1305 may be further configured to condition the signals that are measured such that the signals may be processed by the processor sub-module 1307. The processor sub-module 1307 may be configured to determine various parameters (e.g., instantaneous power, peak power, power factor, etc.) based on various measurements provided by the sensing and conditioning sub-module 1305. Various measurements and processing results may be stored in the memory 1306. The communication sub-module 1308 may be configured to receive and/or transmit data such as instructions (e.g., a voltage set point), various measurements (e.g., voltage, current, or power factor), diagnostic information, timestamp, or any data related to the operation of the DCVS 1300. The DCVS module 1302 may be coupled to the smart meter module 1301. Various data (e.g., a voltage set point, a voltage, a current, a power factor, or a timestamp) may be exchanged between the DCVS module 1302 and smart meter module 1301 via a communication interface. The DCVS 1300 may be configured to be coupled to a power supply 1303 such as an electric utility, a micro-grid, or a power supply bus. The DCVS 1300 may further comprise a surge protection module that protects the smart meter module 1301 and the DCVS module 1302.

The cost of integrating the DCVS module 1302 with the smart meter module 1301 is only marginal. An effective VAR cloud that has tremendous VAR support potential may be formed. As an example, if there are 1 million DCVS installed on the utility network and all are integrated with 1 kVAR DCVS modules and smart meter modules. The cost of integrating a DCVS with a smart meter module is very small, for example, around 10% of the cost of the smart meter. Further, the VAR cloud formed may provide a support capability of 1000 MVAR with unprecedented levels of granularity.

In some embodiments, the smart meter module 1301 and the DCVS module 1302 are placed in a housing 1310, as illustrated. In some embodiments, the DCVS module 1302 is coupled to the smart meter module 1301 using a coupling mechanism such as a meter collar or external adjacent enclosure. The smart meter module 1301 and the DCVS module 1302 may be deployed to and installed in a power system at the same time. As such, the cost of installation and commissioning may be leveraged. In various embodiments, a DCVS 1300 is controlled using a distributed algorithm, as described herein, that prevents fighting between adjacent units and still provides fast dynamic responses. In further embodiments, another module such as a home energy management module, a temperature management module, an electric vehicle module may be configured to integrate a DCVS therein. These modules may be implemented similar to the smart meter module 1301 as illustrated in FIG. 13 and various embodiments may be deployed at different customer locations. Various embodiments may provide VAR controls at different levels. Moreover, processor sub-module 1307 can determine which VAR compensation components of the plurality of VAR sources are enabled and which VAR compensation components of the plurality of VAR sources are not enabled with the objective of uniformly distributing number of operation and usage across the different VAR sources to ensure long life of the components.

In various embodiments, a DCVS uses the hybrid switching strategies in which a semiconductor switch is coupled with a relay in parallel. The semiconductor switch (e.g., a triac or thyristor pair) provides high speed switching and the relay ensures low losses. The line voltage and the voltage across the semiconductor switch may be detected. The DCVS may be turned on to provide VAR control when insertion of VARs is required and when the instantaneous voltage across the device is near a zero value. The semiconductor switch may be further coupled to a NTC in series. The NTC is configured to manage inrush currents that may flow due to any residual voltages resulting from inexact sampling, harmonics, or other inaccuracies. The semiconductor switch may be turned on at an arbitrary time, but losses may be higher, and coordination with the state of the NTC may be necessary. When a DCVS includes low-loss capacitors implemented with the hybrid switching strategies, losses may be kept to less than 2 watts per kVAR of injection. As such, a VAR source (e.g., a DCVS module 1302) may be encased with a smart meter module in the same housing.

When the semiconductor switch is conducting, the time taken for the NTC resistance to reach a predetermined value (e.g., a stable low value) is measured. It may require more time for a NTC to reach a stable low value at colder ambient temperatures. The time may be monitored or the voltage across the NTC may be monitored and only when it reaches a stable low value, the relay coupled to the semiconductor switch is turned ON. The relay may be turned ON at a predetermined time period which ensures stable low value of the NTC under the entire operating temperature range internal to the DCVS unit. The losses in the switches are reduced yet sub-cycle switching speeds are ensured. When turning off a DCVS, the semiconductor switch is turned on and subsequently, the relay is turned off. A small overlap in the operation of the semiconductor switch and the relay is ensured and a current conduction path is provided, which avoids arcing or high energy dissipation across the relay and ensures long life of the components. Once the relay is turned off, the semiconductor switch may be turned off at a zero current crossing.

Figure 14A:
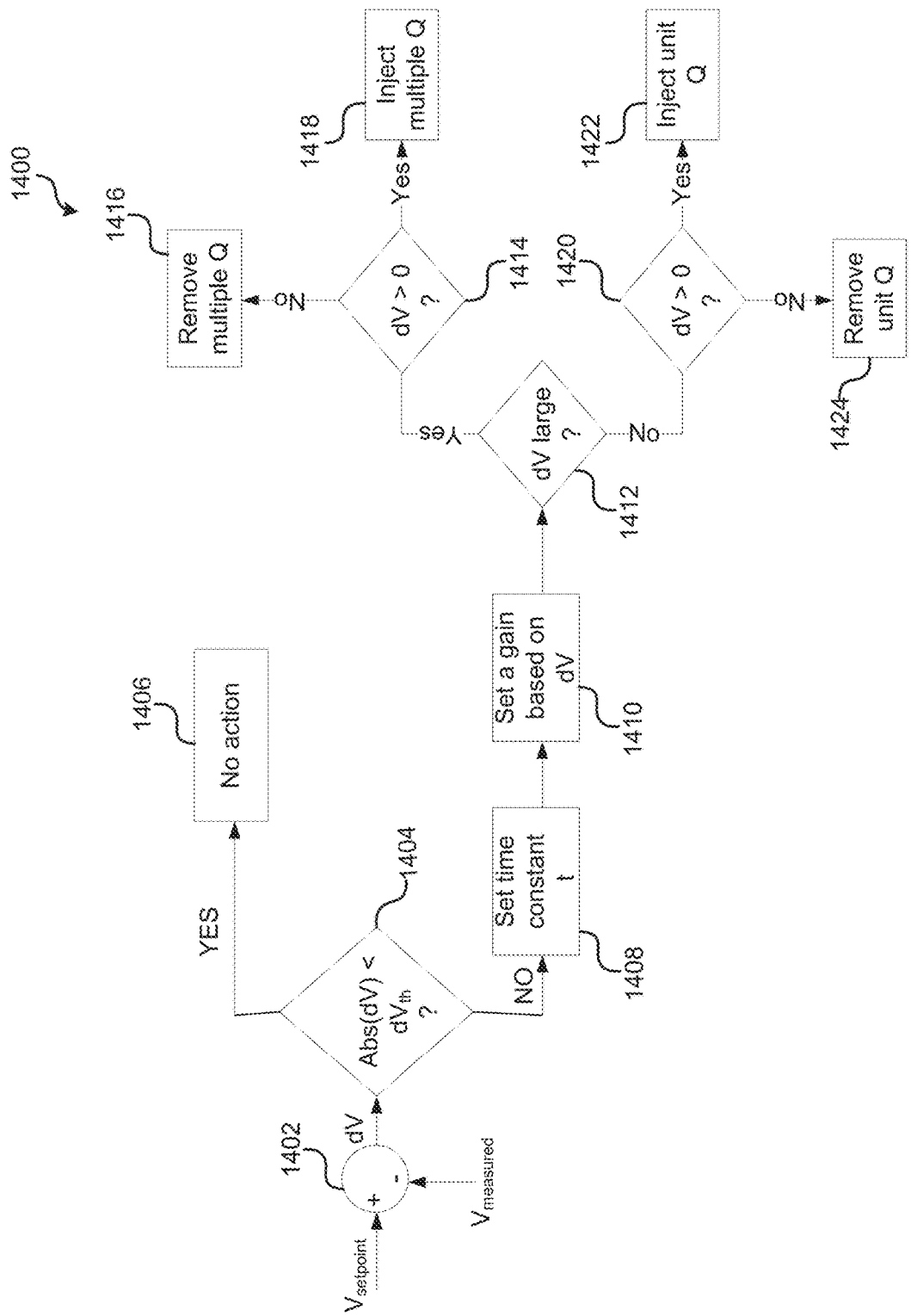
FIG. 14A is a control diagram of an exemplary method of controlling a DCVS in some embodiments.

FIG. 14A is a control diagram of an example method of controlling a DCVS in some embodiments. Various embodiments implement a 'randomized temporal droop' strategy to prevent in-fighting among multiple DCVS's deployed on a system. A time constant of response for different embodiments may be randomized, and a gain that decreases as the error is reduced may be used. In various embodiments, a DCVS that is closer to the source of a disturbance may respond faster and more aggressively than a DCVS that is further from the source of the disturbance. As such, in-fighting between different DCVS's may be prevented by using asymptotic settling through gains that get lower as the error is reduced. Accordingly, the overall system-level response times may be longer than individual unit response times.

As illustrated, at block 1402, a voltage difference is determined by comparing the actual voltage of a DCVS measured to the voltage set point of the DCVS. At block 1404, the absolute value of the voltage difference is compared to a predetermined voltage threshold. If the voltage difference exceeds the predetermined voltage threshold, no action is taken at block 1406. If the voltage difference does not exceed the predetermined voltage threshold, a time constant of response t is set for the DCVS. The time constant of response t may be randomized such that DCVS's in close proximity do not fight with each other. At block 1410, a gain is determined and set for the DCVS. The gain may be proportional to the voltage difference to ensure asymptotic stability and convergence of the system. At block 1412, it is determined whether the voltage difference is large. If so, at block 1414, the voltage difference is compared to the value zero. At block 1416, if the voltage difference does not exceed the value zero, multiple VARs (which are examples of DCVS's) or Qs are determined to be removed. At block 1418, if the voltage difference exceeds the value zero, multiple DCVS's are determined to inject VAR or Q. Referring again to block 1412, if the voltage difference is determined not to be large, only the DCVS is determined to operate. At block 1420, the voltage difference is compared to the value zero. At block 1422, if the voltage difference exceeds the value zero, the DCVS is determined to inject VAR or Q. At block 1424, if the voltage difference does not exceed the value zero, the VAR or Q is determined to be removed. It should be noted that the VAR provided by a DCVS may be leading or lagging.

Figure 14B:
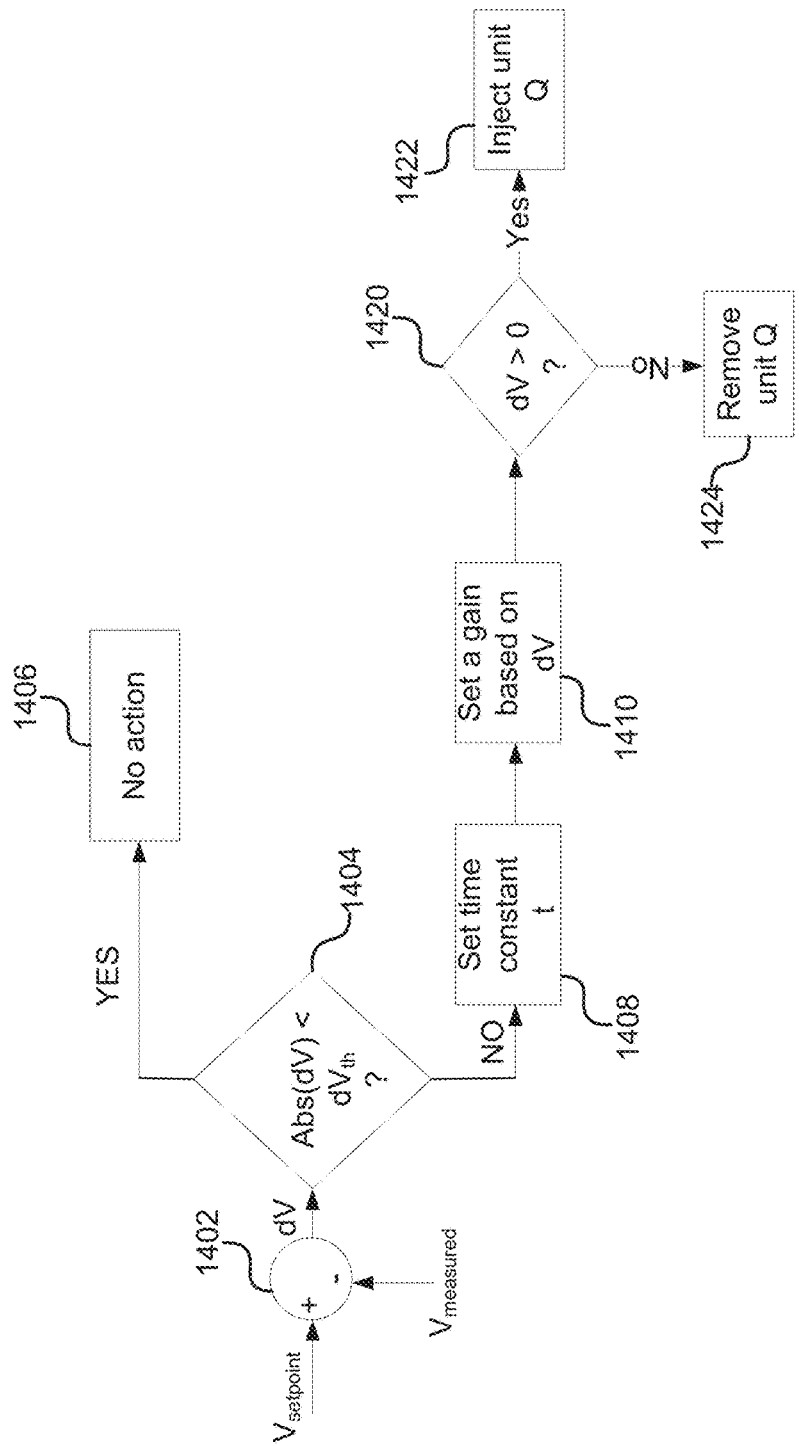
FIG. 14B depicts an example method of controlling a DCVS in a scenario where the DCVS is integrated into a customer-located asset, such as a smart meter.

FIG. 14B illustrates one specific example method of controlling a DCVS, based on the above-described method of FIG. 14A, in a scenario where a DCVS is integrated into a smart meter. As illustrated, at block 1402, a voltage difference is determined by comparing the actual voltage of a DCVS measured to the voltage set point of the DCVS. At block 1404, the absolute value of the voltage difference is compared to a predetermined voltage threshold. If the voltage difference exceeds the predetermined voltage threshold, no action is taken at block 1406. If the voltage difference does not exceed the predetermined voltage threshold, a time constant of response t is set for the DCVS. The time constant of response t may be randomized such that DCVS's in close proximity do not fight with each other. At block 1410, a gain is determined and set for the DCVS. The gain may be proportional to the voltage difference to ensure asymptotic stability and convergence of the system. In contrast to the method of FIG. 14A, however, the next determination that is made is to determine, at block 1420, whether the voltage difference is greater than the value zero. At block 1422, if the voltage difference exceeds the value zero, the DCVS is determined to inject VAR or Q. At block 1424, if the voltage difference does not exceed the value zero, the VAR or Q is determined to be removed. Again, the VAR provided by a DCVS may be leading or lagging.

Communication latencies do not limit the ability of a DCVS to respond to desired changes. When system configuration changes occur due to loss of a line or other system fault, fast VAR responses are necessary. A transmission fault can trigger a Fault Induced Delayed Voltage Recovery (FIDVR) event that can cause voltage collapse. For such disturbances, a DCVS may automatically provide the level of VARs needed to support the system during and through the fault. This automatic functionality may be achieved autonomously with no fast communication from a central command to the distributed DCVS's. For example, for a utility with one million DCVS's, each of which comprises a smart meter module and a DCVS module with a 1 kVAR VAR source. Accordingly, as much as 1000 MVAR of distributed dynamic VARs are available for grid support. Multi-variable optimization may be achieved with a distributed VAR system. Depending on the level of VAR resources for each DCVS, multiple optimization functions may be simultaneously achieved. For example, secondary side voltage regulation at most nodes, primary voltage regulation, or control of feeder level VARs may be achieved. In some embodiments, depending on the level of granularity for VAR control at individual distribution transformers, the power factor at individual transformers may also be controlled. The voltage across the feeder may be independently controlled from the VARs. Optimization strategies such as Conservation Voltage Reduction ("CVR"), peak demand management, or line loss minimization, even as voltage compliance requirements are met.

A cloud of VAR sources may provide local, regional and system level benefits. Locally, each VAR source may inject VARs to correct the voltage moving it closer to the respective voltage set point. In addition, setting the voltage set point at the same value for all the devices in a region, may allow the primary voltage to move substantially towards the same effective voltage set point. If a local VAR source has sufficient granularity and control range, the node to which the local VAR source is coupled may operate in a manner to improve the power factor closer to unity. By improving the primary voltage closer to the voltage set point, the voltage profile may be improved even for those nodes without any VAR sources connected. At a feeder level, if a voltage control device such as a Load Tap Changer (LTC) or Line Voltage Regulator (LVR) is present, coordination of control between the LTC voltage set point and the voltage set point for the VAR cloud, may realize independent decoupled control of the feeder voltage and the VARs measured at the substation. The LTC voltage set point and the VAR cloud set point may be regulated to achieve control of feeder, regional and local voltages as well as the VARs.

Figure 15:
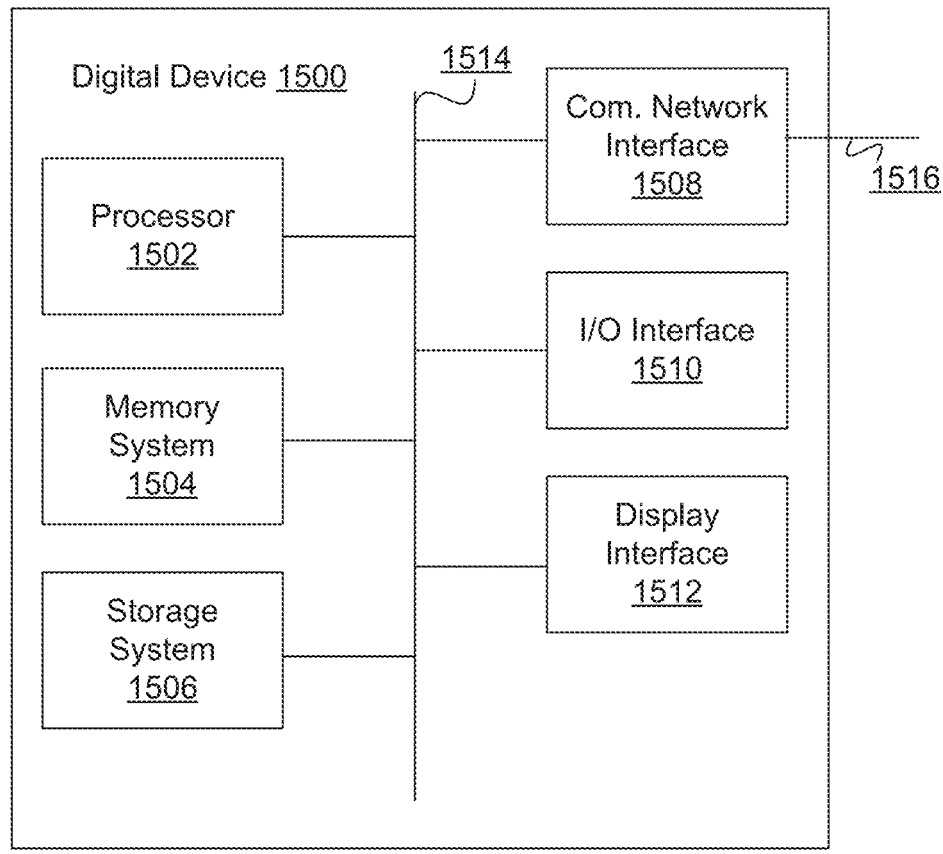
FIG. 15 is a block diagram of an exemplary digital device.

FIG. 15 is a block diagram of an exemplary digital device 1500. In some embodiments, the digital device 1500 may provide set points and/or profiles to one or more switch-controlled VAR sources. The digital device 1500 may also receive voltage and/or power tracking information which may be used to track usage, identify potential theft, and/or maintain grid assets. Further, in various embodiments, the digital device 1500 may coordinate and/or control any number of switch-controlled VAR sources.

The digital device 1500 comprises a processor 1502, a memory system 1504, a storage system 1506, a communication network interface 1508, an optional I/O interface 1510, and an optional display interface 1512 communicatively coupled to a bus 1514. The processor 1502 is configured to execute executable instructions (e.g., programs). In some embodiments, the processor 1502 comprises circuitry or any processor capable of processing the executable instructions.

The memory system 1504 is any memory configured to store data. Some examples of the memory system 1504 are storage devices, such as RAM or ROM. The memory system 1504 can comprise the ram cache. In various embodiments, data is stored within the memory system 1504. The data within the memory system 1504 may be cleared or ultimately transferred to the storage system 1506.

The data storage system 1506 is any storage configured to retrieve and store data. Some examples of the data storage system 1506 are firmware memory, flash drives, hard drives, optical drives, and/or magnetic tape. In some embodiments, the digital device 1500 includes a memory system 1504 in the form of RAM and a data storage system 1506 in the form of flash data. Both the memory system 1504 and the data storage system 1506 comprise computer readable media which may store instructions or programs that are executable by a computer processor including the processor 1502.

The communication network interface (com. network interface) 1508 can be coupled to a network (e.g., communication network 164) via the link 1516. The communication network interface 1508 may support communication over an Ethernet connection, a serial connection, a parallel connection, or an ATA connection, for example. The communication network interface 1508 may also support wireless communication (e.g., 802.16 a/b/g/n, WiMax). It will be apparent to those skilled in the art that the communication network interface 1508 can support many wired and wireless standards.

The optional input/output (I/O) interface 1510 is any device that receives input from the user and output data. The optional display interface 1512 is any device that is configured to output graphics and data to a display. In one example, the display interface 1512 is a graphics adapter. It will be appreciated that not all digital devices 1500 comprise either the I/O interface 1510 or the display interface 1512.

It will be appreciated by those skilled in the art that the hardware elements of the digital device 1500 are not limited to those depicted in FIG. 15. A digital device 1500 may comprise more or less hardware elements than those depicted. Further, hardware elements may share functionality and still be within various embodiments described herein. In one example, encoding and/or decoding may be performed by the processor 1502 and/or a co-processor located on a GPU (i.e., NVidia).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

Various embodiments are described herein as examples. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A method of controlling a plurality of distributed controllable voltage ampere reactive (VAR) sources (DCVS's), comprising:
    detecting, by a first distributed controllable Volt-Ampere Reactive ("VAR") source of said plurality of distributed controllable voltage ampere reactive (VAR) sources (DCVS's) at an edge of a distribution power network proximate to a first load, a first proximate voltage, the first load configured to receive power from the distribution power network, the first distributed controllable Volt-Ampere Reactive ("VAR") source comprising a first processor and a first VAR compensation component;
    monitoring the first proximate voltage by waiting for a first delay and then evaluating the first proximate voltage;
    detecting, by a second distributed controllable Volt-Ampere Reactive ("VAR") source of said plurality of distributed controllable voltage ampere reactive (VAR) sources (DCVS's) at the edge of the distribution power network proximate to a second load, a second proximate voltage, the second distributed controllable Volt-Ampere Reactive ("VAR") source comprising a second VAR compensation component and a second processor;
    monitoring the second proximate voltage by waiting for a second delay and then evaluating the second proximate voltage;
    wherein the first delay is not equal to the second delay;
    determining a voltage difference by comparing an actual voltage of one of the plurality of the DCVS's measured to a voltage set point of the DCVS;
    comparing the voltage difference to a threshold voltage;
    setting a time constant for the DCVS if the voltage difference does not exceed the threshold voltage;
    determining and setting a gain for the DCVS; and
    depending on whether the voltage difference at least exceeds a zero value, removing at least one VAR source of the plurality of the DCVS's or injecting reactive power via at least one DCVS of the plurality of the DCVS's.

2. The method of claim 1, further comprising, taking no action to set a time constant, if the voltage difference exceeds the threshold voltage.

3. The method of claim 1, wherein the time constant is randomized such that operation of neighboring DCVS's of the plurality of the DCVS's, do not conflict with each other.

4. The method of claim 1, wherein the gain is proportional to the voltage difference.

5. The method of claim 1, wherein the removal of at least one VAR source of the plurality of the DCVS's comprises removal of multiple VAR sources when the voltage difference does not exceed the zero value.

6. The method of claim 1, wherein the injection of the reactive power via at least one DCVS of the plurality of the DCVS's comprises enabling multiple VAR sources to inject reactive power when the voltage difference at least exceeds the zero value.

7. The method of claim 1, wherein the removal of at least one VAR source of the plurality of the DCVS's comprises removal of a DCVS when the voltage difference does not exceed the zero value.

8. The method of claim 1, wherein the injection of the reactive power via at least one DCVS of the plurality of the DCVS's comprises enabling a DCVS to inject reactive power when the voltage difference exceeds the zero value.

* * * * *